United States Patent
Beale et al.

(10) Patent No.: US 7,292,825 B2
(45) Date of Patent: Nov. 6, 2007

(54) RETRANSMISSION SCHEME IN A CELLULAR COMMUNICATION SYSTEM

(75) Inventors: Martin W. Beale, Bristol (GB); Nicholas W. Anderson, Bristol (GB)

(73) Assignee: IPWireless, Inc., San Bruno, CA (US)

( * ) Notice: Subject to any disclaimer, the term of this patent is extended or adjusted under 35 U.S.C. 154(b) by 368 days.

(21) Appl. No.: 10/969,102

(22) Filed: Oct. 19, 2004

(65) Prior Publication Data

US 2006/0084389 A1   Apr. 20, 2006

(51) Int. Cl.
*H04B 17/00* (2006.01)

(52) U.S. Cl. .................. 455/67.11; 455/67.13; 455/63.1; 455/522; 455/561; 370/230; 370/286; 370/252; 370/445; 714/774; 714/748

(58) Field of Classification Search .......... 455/67.11, 455/67.13, 63.1, 67.14, 522, 226.1, 561; 714/774, 748
See application file for complete search history.

(56) References Cited

U.S. PATENT DOCUMENTS

| | | | | |
|---|---|---|---|---|
| 6,310,872 B1 * | 10/2001 | Almgren et al. | ............ | 370/349 |
| 6,335,922 B1 * | 1/2002 | Tiedemann et al. | ......... | 370/335 |
| 6,788,687 B2 * | 9/2004 | Bao et al. | ................... | 370/394 |
| 6,807,426 B2 * | 10/2004 | Pankaj | ........................ | 455/453 |
| 6,823,005 B1 * | 11/2004 | Chuang et al. | ............. | 375/227 |
| 7,054,270 B2 * | 5/2006 | Yi et al. | ...................... | 370/232 |
| 7,054,293 B2 * | 5/2006 | Tiedemann et al. | ......... | 370/335 |
| 7,110,786 B2 * | 9/2006 | Moulsley et al. | ........... | 455/522 |
| 7,120,134 B2 * | 10/2006 | Tiedemann et al. | ......... | 370/329 |

| | | | |
|---|---|---|---|
| 2002/0119799 A1 | 8/2002 | Moulsley et al. | |
| 2002/0173315 A1 | 11/2002 | Chmaytelli et al. | |

FOREIGN PATENT DOCUMENTS

WO   WO-2004/075568   9/2004

OTHER PUBLICATIONS

Holma, H. ed., (2001) *WCDMA for UMTS*, Wiley & Sons, ISBN-0471486876.
Mouly, M., et al. (1992) *The GSM System for Mobile Communications*, Bay Foreign Language Books, ISBN-2950719007.
Abedi, S. et al. (2002). "A Radio Aware Random Iterative Scheduling Technique for High Speed Downlink Packet Access," IEEE, p. 2322-2325.

* cited by examiner

*Primary Examiner*—Marceau Milord
(74) *Attorney, Agent, or Firm*—Morrison & Foerster LLP

(57) ABSTRACT

An apparatus 300 for a cellular communication system (100) comprises a buffer (303) which receives data for transmission over an air interface (115). The buffer (303) is coupled to a scheduler (305) which schedules the data and allocates the physical resource of the air interface (115). The transmissions are performed using a retransmission scheme such as a Hybrid-Automatic Repeat reQuest scheme. A load processor (309) determines a load characteristic associated with the scheduler (305) and a target controller (311) sets a target parameter for the retransmission scheme in response to the load characteristic. Specifically, a block error rate target may be set in response to a load level of a cell or plurality of cells. A transmission controller (307) sets a transmission parameter for a transmission in response to the target parameter and a transmitter (301) transmits the data using the transmission parameter. Accordingly, an operating point of the retransmission scheme may be dynamically adjusted thereby reducing overall latency.

69 Claims, 9 Drawing Sheets

RETRANSMISSION SCHEME IN A CELLULAR COMMUNICATION SYSTEM

FIELD OF THE INVENTION

The invention relates to an apparatus, a base station and a method for controlling at least one transmission of a retransmission scheme in a cellular communication system.

BACKGROUND OF THE INVENTION

In a cellular communication system, a geographical region is divided into a number of cells each of which is served by base stations. The base stations are interconnected by a fixed network which can communicate data between the base stations. A mobile station is served via a radio communication link from the base station of the cell within which the mobile station is situated.

A typical cellular communication system extends coverage over an entire country and comprises hundreds or even thousands of cells supporting thousands or even millions of mobile stations. Communication from a mobile station to a base station is known as the uplink, and communication from a base station to a mobile station is known as the downlink.

The fixed network interconnecting the base stations is operable to route data between any two base stations, thereby enabling a mobile station in a cell to communicate with a mobile station in any other cell. In addition, the fixed network comprises gateway functions for interconnecting to external networks such as the Internet or the Public Switched Telephone Network (PSTN), thereby allowing mobile stations to communicate with landline telephones and other communication terminals connected by a landline. Furthermore, the fixed network comprises much of the functionality required for managing a conventional cellular communication network including functionality for routing data, admission control, resource allocation, subscriber billing, mobile station authentication etc.

Currently, the most ubiquitous cellular communication system is the 2nd generation communication system known as the Global System for Mobile communication (GSM). GSM uses a technology known as Time Division Multiple Access (TDMA) wherein user separation is achieved by dividing frequency carriers into 8 discrete time slots, which individually can be allocated to a user. Further description of the GSM TDMA communication system can be found in 'The GSM System for Mobile Communications' by Michel Mouly and Marie Bernadette Pautet, Bay Foreign Language Books, 1992, ISBN 2950719007.

Currently, 3rd generation systems are being rolled out to further enhance the communication services provided to mobile users. The most widely adopted 3rd generation communication systems are based on Code Division Multiple Access (CDMA) technology. Both Frequency Division Duplex (FDD) and Time Division Duplex (TDD) techniques employ this CDMA technology. In CDMA systems, user separation is obtained by allocating different spreading and scrambling codes to different users on the same carrier frequency and in the same time intervals. In TDD, additional user separation is achieved by assigning different time slots to different users similarly to TDMA. However, in contrast to TDMA, TDD provides for the same carrier frequency to be used for both uplink and downlink transmissions. An example of a communication system using this principle is the Universal Mobile Telecommunication System (UMTS). Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

In a 3rd generation cellular communication system, the communication network comprises a core network and a Radio Access Network (RAN). The core network is operable to route data from one part of the RAN to another, as well as interfacing with other communication systems. In addition, it performs many of the operation and management functions of a cellular communication system, such as billing. The RAN is operable to support wireless user equipment over a radio link of the air interface. The RAN comprises the base stations, which in UMTS are known as Node Bs, as well as Radio Network Controllers (RNC) which control the base stations and the communication over the air interface.

The RNC performs many of the control functions related to the air interface including radio resource management and routing of data to and from appropriate base stations. It further provides the interface between the RAN and the core network. An RNC and associated base stations are known as a Radio Network Subsystem (RNS).

3rd generation cellular communication systems have been specified to provide a large number of different services including efficient packet data services. For example, downlink packet data services are supported within the 3GPP release 5 specifications in the form of the High Speed Downlink Packet Access (HSDPA) service. A High Speed Uplink Packet Access (HSUPA) feature is also in the process of being standardised. This uplink packet access feature will adopt many of the features of HSDPA.

In accordance with the 3GPP specifications, the HSDPA service may be used in both Frequency Division Duplex (FDD) mode and Time Division Duplex (TDD) mode.

In HSDPA, transmission code resources are shared amongst users according to their traffic needs. The base station or "Node-B" is responsible for allocating and distributing the resources to the users, within a so-called scheduling task. Hence, for HSDPA, some scheduling is performed by the RNC whereas other scheduling is performed by the base station. Specifically, the RNC allocates a set of resources to each base station, which the base station can use exclusively for high speed packet services. The RNC furthermore controls the flow of data to and from the base stations. However, the base station schedules transmissions to the mobile stations that are attached to it, operates a retransmission scheme, controls the coding and modulation for transmissions to and from the mobile stations and transmits (for HSDPA) and receives (for HSUPA) data packets from the mobile units.

HSDPA and HSUPA seek to provide packet access techniques with a relatively low resource usage and with low latency.

Specifically, HSDPA and HSUPA use the following techniques in order to reduce the resource required to communicate the data thereby increasing the capacity of the communication system:

Adaptive Coding and Modulation. The coding and modulation schemes may dynamically be selected to be optimised for the current radio conditions thereby providing effective link adaptation. For example, in HSDPA, the 16QAM higher order modulation may be used to increase throughput for users in favourable radio conditions whereas the less efficient but more robust QPSK modulation may be used at less favourable radio conditions.

Retransmission with soft combining. HSDPA and HSUPA use a retransmission scheme known as a Hybrid-Automatic Retransmission reQuest (H-ARQ) scheme wherein retransmissions are soft combined with previous transmissions in order to achieve an efficient communication. The H-ARQ scheme is typically operated at a higher block error rate for individual transmissions in order to increase efficiency, but the final block error rate after soft combining is similar to the block error rate for pre-HSDPA systems.

Fast scheduling is performed at the base station. This allows scheduling to be sufficiently fast to dynamically follow radio condition variations. For example, when more than one mobile unit requires service, the base station may schedule data to the mobile stations experiencing favourable radio conditions in preference to the mobile stations experiencing less favourable conditions. Furthermore, the resources allocated and the coding and modulation applied to transmissions to mobile stations may be highly tailored to the current radio conditions experienced by the individual mobile station.

HSDPA and HSUPA furthermore use the following techniques in order to reduce the delay (latency) associated with the data communication:

Short transmission time intervals. Specifically, data transport blocks are sent to the transmitter at frequent time intervals thereby allowing for transmissions and retransmissions to be transmitted with a minimum of delay.

Scheduling and retransmission functionality located at the base station. This may reduce the delay associated with scheduling and retransmissions as control and data need not be communicated between the RNC and the base station.

Increased capacity. The reduced resource usage and associated increased capacity in itself reduces the delay incurred by buffering of data as a higher data capacity may provide a higher throughput and thus reduced queue sizes.

However, despite these techniques, the performance is not optimal. Specifically, in conventional systems an operating point is selected to provide an acceptable capacity and latency performance. Although such an operating point may provide acceptable performance in general, it is not optimal for many situations and may in particular result in a relatively high latency. For example, although an increased capacity may reduce queuing delays, it may also increase other delays such as the delay associated with retransmissions. Therefore, in order to achieve a sufficiently high capacity, the retransmission delays may frequently result in a latency which is higher than desired.

For example, in order to achieve a sufficiently high capacity, it is important to transmit data packets at a sufficiently low transmit power. The associated queuing delay is thus reduced. However, this results in an increased block error rate and thus an increased number of retransmissions being required for successful communication. As the delay before a retransmission occurs is substantial, this may substantially increase the resulting average delay of transmitting data packets.

Hence, an improved system for communication would be advantageous and in particular a system allowing for increased flexibility, improved performance, reduced latency and/or increased capacity would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention, there is provided an apparatus for a cellular communication system; the apparatus comprising: a scheduler for scheduling data for transmission over an air interface of the cellular communication system using a retransmission scheme; load means for determining a load characteristic associated with the scheduler; means for setting a target parameter for the retransmission scheme in response to the load characteristic; and means for setting a transmission parameter for a transmission in response to the target parameter.

The invention may provide for an improved performance of a cellular communication system. In particular, the invention may allow an improved performance wherein an operating point of a retransmission scheme may be adapted to the current characteristics of the cellular communication system. The invention may allow a trade off between resource usage and delay to be dynamically adjusted and/or may allow an improved trade off between queuing delays and retransmission delays. For example, at low loads, the transmission parameter may be set to result in a high resource usage per transmitted information bit but low probability of retransmissions thereby reducing retransmission delays whereas at high loads, the transmission parameter may be set to result in a low resource usage per transmitted information bit but at a higher probability of retransmissions thereby reducing the queuing delay and increasing capacity. In some embodiments, the latency associated with communication of data may be reduced or minimised.

The target parameter may specifically control the operating point of the retransmission scheme. The functionality of the apparatus may be distributed between different units and may in particular be distributed between a fixed network of the cellular communication system (including the base stations) and user equipment of the cellular communication system. Thus, in some embodiments, the apparatus may be distributed across an air interface of the cellular communication system. For example, the transmission may be a transmission by a user equipment whereas the scheduler, the load means and/or the means for setting the target parameter may be implemented in the fixed network and in particular in a base station.

The load characteristic may be indicative of a loading of the scheduler, of a loading of a cell, of a loading of a plurality of cells or e.g. a loading of the cellular communication system as a whole.

According to an optional feature of the invention, the transmission parameter comprises a message transmit power. This provides a suitable parameter to control the retransmission scheme and allows a retransmission latency to be effectively and advantageously controlled.

According to an optional feature of the invention, the transmission parameter comprises a transmit power reference indication. This provides a suitable parameter to control the retransmission scheme and allows a retransmission latency to be effectively and advantageously controlled. In particular, the power reference indication may allow control of the retransmission performance while allowing e.g. a link adaptation to also be performed.

The power reference may be used by a power control mechanism and/or a link adaptation mechanism.

For example, for a HSDPA or HSUPA service of a UMTS cellular communication system, a power reference may be provided which is used as a basis for the base station and/or remote unit to determine a transmit transport format.

According to an optional feature of the invention, the target parameter comprises an error rate. In particular, the error rate may a Block Error Rate (BLER). The BLER may be a Packet Error Rate (PER).

An error rate provides a particularly suitable parameter for controlling an operation of a retransmission scheme. In particular an error rate, such as the BLER, is a particularly suitable parameter for controlling a retransmission probability and thus a retransmission latency.

According to an optional feature of the invention, the transmission parameter comprises a modulation parameter. The modulation parameter may for example be a modulation order or a spreading factor. A modulation parameter is particularly advantageous for controlling transmissions and in particular retransmission probabilities and may specifically be compatible with existing systems such as the HSDPA and HSUPA services of UMTS.

According to an optional feature of the invention, the transmission parameter comprises an error coding parameter. The error coding parameter may for example be a Forward Error Correction (FEC) scheme to be applied to transmitted data. For example, the FEC rate may be set in response to the target parameter. In some embodiments, the transmission parameter may be an indirect error coding parameter such as an indication of a resource allocation and an amount of information data to be communicated within the resource allocation. An error coding parameter is particularly advantageous for controlling transmissions and in particular retransmission probabilities and may specifically be compatible with existing systems such as the HSDPA and HSUPA services of UMTS. The transmission parameter may specifically comprise a combined error coding and modulation parameter.

According to an optional feature of the invention, the transmission parameter comprises a transmission parameter set restriction. This may provide a particularly suitable transmission parameter for controlling the transmission performance and may in particular allow an interference level to be limited. The transmission parameter set restriction may restrict the set of transmission parameters from which parameters for the transmission can be selected. For example, in a HSDPA or HSUPA service of a UMTS cellular communication system, the transmission parameter set restriction may be a restriction of the Transmit Format Combinations (TFCs) that can be used.

According to an optional feature of the invention, the transmission parameter is a transmission parameter of an initial transmission of a message. This may provide particularly advantageous performance and efficient control. For example, the probability of receiving the initial transmission in a retransmission scheme has a major effect on the average retransmission delay for the retransmission operation.

According to an optional feature of the invention, the probability of a retransmission request is dependent on the setting of the transmission parameter. The probability of retransmissions may depend on the setting of the transmission parameter. The invention may advantageously provide a means for controlling retransmission characteristics and in particular a retransmission latency by controlling a transmission parameter in response to a target parameter.

According to an optional feature of the invention, the load means is operable to determine the load characteristic in response to an amount of pending transmit data. This provides an advantageous measure of the loading of the system. In many embodiments, a determination of the load characteristic in response to the amount of pending data is particularly simple yet provides an accurate indication of the current load.

According to an optional feature of the invention, the pending transmit data is associated with a single cell. This may allow for a particularly simple implementation in some embodiments. In particular, it may in many embodiments allow a determination of the load characteristic based only on information available at a base station. Hence, the load characteristic may in some such embodiments be determined individually by the base station.

According to an optional feature of the invention, the pending transmit data is associated with a radio controller common for a plurality of cells. This may allow for a particularly simple implementation in some embodiments. In particular, it may in many embodiments allow a determination of the load characteristic based only on information available at the radio controller. Hence, the load characteristic may in some such embodiments be determined individually by the radio controller. The feature may additionally or alternatively improve performance by controlling the retransmission scheme in response to the conditions in the plurality of cells.

The radio controller may specifically be a Radio Network Controller (RNC).

According to an optional feature of the invention, the amount of pending data corresponds to a transmit data buffer loading. This may provide for a particularly low complexity determination of the load characteristic and/or may provide a particularly suitable load characteristic. The transmit data buffer may for example be a transmit buffer of a radio network controller, a base station and/or a remote unit.

According to an optional feature of the invention, the load means is operable to determine the load characteristic in response to a number of attached remote units.

This may provide a particularly suitable load characteristic which may provide a suitable measure of the loading of cell(s) of the cellular communication system. Alternatively or additionally, this may provide for a low complexity determination of the load characteristics and may in particular utilise readily available information. For example, the higher the number of attached remote units, the higher the loading may be considered to be.

The number of attached remote units may be determined in response to a selection and/or filtering criterion. For example, the number may be a number of active remote units in a single cell, a number of remote units requesting service etc.

According to an optional feature of the invention, the transmission parameter is biased towards an increasing number of retransmissions for an increasing load. This may improve performance, may allow an improved and dynamic trade off between capacity and latency and/or may allow an improved trade off between queuing latency and retransmission latency.

For example, at low loading the transmission parameter may be set to have a negligible probability of retransmissions (e.g. the BLER may be set very low). Accordingly, a high amount of resource may be used but the retransmission latency may be reduced significantly. At higher loadings, the additional resource will typically not be available and the setting would result in reduced capacity and increased queuing delays. Accordingly, in the example, the transmission parameter is set to a higher probability of retransmissions (e.g. the BLER may be set to a high value). This will result in a lower resource usage (in particular when an H-ARQ scheme is used) and thus reduced queuing delays at the expense of an increased retransmission delay.

According to an optional feature of the invention, the apparatus further comprises means for measuring a performance characteristic; and the means for setting the target parameter is further operable to set the target parameter in response to the performance characteristic.

According to an optional feature of the invention, the transmission is a downlink transmission. The transmission may in particular be a HSDPA transmission.

According to an optional feature of the invention, the transmission is an uplink transmission. The transmission may in particular be a HSUPA transmission.

According to an optional feature of the invention, the load means is operable to determine the load characteristic in response to a load indication received from a remote unit. This may be particularly suitable for uplink communication and may facilitate implementation of functionality in a fixed network of the communication system while allowing the determination to be in response to characteristics of the remote unit. The load indication may in particular be an indication of a transmit buffer loading of the remote unit.

According to an optional feature of the invention, the apparatus further comprises means for transmitting an indication of the target parameter from a base station to a remote station. This may in many embodiments facilitate or enable implementation and/or a suitable distribution of functionality. In particular, it may allow different elements to be implemented where it is most suitable. For example, it may allow the load means and the means for setting the target parameter to be implemented in the fixed network while allowing the means for setting the transmission parameter to be implemented in a remote unit.

According to an optional feature of the invention, the apparatus further comprises means for transmitting an indication of the transmission parameter from a base station to a remote station. This may in many embodiments facilitate or enable implementation and/or a suitable distribution of functionality. In particular, it may allow different elements to be implemented where it is most suitable. For example, it may allow the load means, the means for setting the target parameter and the means for setting the transmission parameter to be implemented in the fixed network while controlling an uplink transmission.

In some embodiments, the indication of the target parameter and/or the transmission parameter may be transmitted to the remote station from a plurality of base stations. In some such embodiments, the remote unit may ignore the indication unless the same indication is received from a plurality of the base stations (and in particular from all the base stations).

According to an optional feature of the invention, the means for setting the transmission parameter is comprised in a base station and the means for setting the target parameter is comprised in a radio network controller which is operable to communicate an indication of the target parameter to the base station. This may provide a particularly advantageous implementation in some embodiments. In particular, it may allow or facilitate the target parameter being determined in a radio network controller based on information, such as scheduling information, available at the radio network controller while allowing efficient operation of the retransmission scheme in the base station.

According to an optional feature of the invention, the apparatus further comprises means for communicating the target parameter to a scheduling function associated with a different cell than a cell associated with the means for determining the target parameter. This may facilitate operation in many embodiments and may additionally or alternatively allow control of the retransmission scheme in response to target parameters for other cells.

According to an optional feature of the invention, the apparatus further comprises means for communicating the load characteristic to a scheduling function associated with a different cell than the means for determining the load characteristic parameter. This may facilitate operation in many embodiments and may additionally or alternatively allow control of the retransmission scheme in response to load characteristics for other cells.

According to an optional feature of the invention, the retransmission scheme is a Hybrid Automatic Repeat reQuest (H-ARQ) scheme. The invention may provide improved performance for an H-ARQ retransmission scheme. In particular, the soft combining of transmissions may be used to increase capacity and reduce queuing delays for high loadings whereas a more robust communication may be used at lower loadings to reduce retransmission delays.

According to an optional feature of the invention, the cellular communication system complies with the Technical Specifications of the $3^{rd}$ Generation Partnership Project (3GPP). The transmission may in particular be a HSDPA or a HSUPA data transmission.

According to a second aspect of the invention, there is provided a base station for a cellular communication system; the apparatus comprising: a scheduler for scheduling data for transmission over an air interface of the cellular communication system using a retransmission scheme; load means for determining a load characteristic associated with the scheduler; means for setting a target parameter for the retransmission scheme in response to the load characteristic; and means for setting a transmission parameter for a transmission in response to the target parameter.

The optional features mentioned in relation to the apparatus are equally applicable to the base station.

According to a third aspect of the invention, there is provided a method of operation for a cellular communication system including at least a scheduler for scheduling data for transmission over an air interface of the cellular communication system using a retransmission scheme, the method comprising: determining a load characteristic associated with the scheduler; setting a target parameter for the retransmission scheme in response to the load characteristic; and setting a transmission parameter for a transmission in response to the target parameter.

According to a fourth aspect of the invention, there is provided an apparatus for a cellular communication system; the apparatus comprising: a scheduler for scheduling data for transmission over an air interface of the cellular communication system using a retransmission scheme; load means for receiving a load characteristic associated with the scheduler; means for setting a target parameter for the retransmission scheme in response to the load characteristic; and means for setting a transmission parameter for a transmission in response to the target parameter.

According to a fifth aspect of the invention, there is provided an apparatus for a cellular communication system; the apparatus comprising: a scheduler for scheduling data for transmission over an air interface of the cellular communication system using a retransmission scheme; means for receiving a target parameter for the retransmission scheme, the target parameter being dependent on a load characteristic associated with the scheduler; and means for setting a transmission parameter for a transmission in response to the target parameter.

According to a sixth aspect of the invention, there is provided an apparatus for a cellular communication system including a scheduler for scheduling data for transmission over an air interface of the cellular communication system using a retransmission scheme; the apparatus comprising: load means for receiving a load characteristic associated with the scheduler; means for setting a target parameter for the retransmission scheme in response to the load characteristic; and means for setting a transmission parameter for a transmission in response to the target parameter.

According to a seventh aspect of the invention, there is provided an apparatus for a cellular communication system including a scheduler for scheduling data for transmission over an air interface of the cellular communication system using a retransmission scheme; the apparatus comprising: means for receiving a target parameter for the retransmission scheme, the target parameter being dependent on a load characteristic associated with the scheduler; and means for setting a transmission parameter for a transmission in response to the target parameter.

According to an eight aspect of the invention, there is provided an apparatus for a cellular communication system including a scheduler for scheduling data for transmission over an air interface of the cellular communication system using a retransmission scheme; the apparatus comprising: load means for receiving a load characteristic associated with the scheduler; means for setting a target parameter for the retransmission scheme in response to the load characteristic; the target parameter being indicative of a setting of a transmission parameter for a transmission.

According to a ninth aspect of the invention, there is provided a method for a cellular communication system including a scheduler for scheduling data for transmission over an air interface of the cellular communication system using a retransmission scheme; the method comprising: receiving a load characteristic associated with the scheduler; setting a target parameter for the retransmission scheme in response to the load characteristic; and setting a transmission parameter for a transmission in response to the target parameter.

According to a tenth aspect of the invention, there is provided a method for a cellular communication system including a scheduler for scheduling data for transmission over an air interface of the cellular communication system using a retransmission scheme; the method comprising: receiving a target parameter for the retransmission scheme, the target parameter being dependent on a load characteristic associated with the scheduler; and setting a transmission parameter for a transmission in response to the target parameter.

According to an eleventh aspect of the invention, there is provided a method for a cellular communication system including a scheduler for scheduling data for transmission over an air interface of the cellular communication system using a retransmission scheme; the method comprising: determining a load characteristic associated with the scheduler; and setting a target parameter for the retransmission scheme in response to the load characteristic; the target parameter being indicative of a setting of a transmission parameter for a transmission.

The optional features mentioned in relation to the apparatus are equally applicable to the method of operation.

These and other aspects, features and advantages of the invention will be apparent from and elucidated with reference to the embodiments described hereinafter.

BRIEF DESCRIPTION OF THE DRAWINGS

An embodiment of the invention will be described, by way of example only, with reference to the drawings, in which.

DETAILED DESCRIPTION OF EMBODIMENTS OF THE INVENTION

The following description focuses on an embodiment of the invention applicable to a UMTS cellular communication system and in particular to an application for a HSDPA or HSUPA service. However, it will be appreciated that the invention is not limited to this application but may be applied to many other cellular communication systems and/or services.

Figure 1:
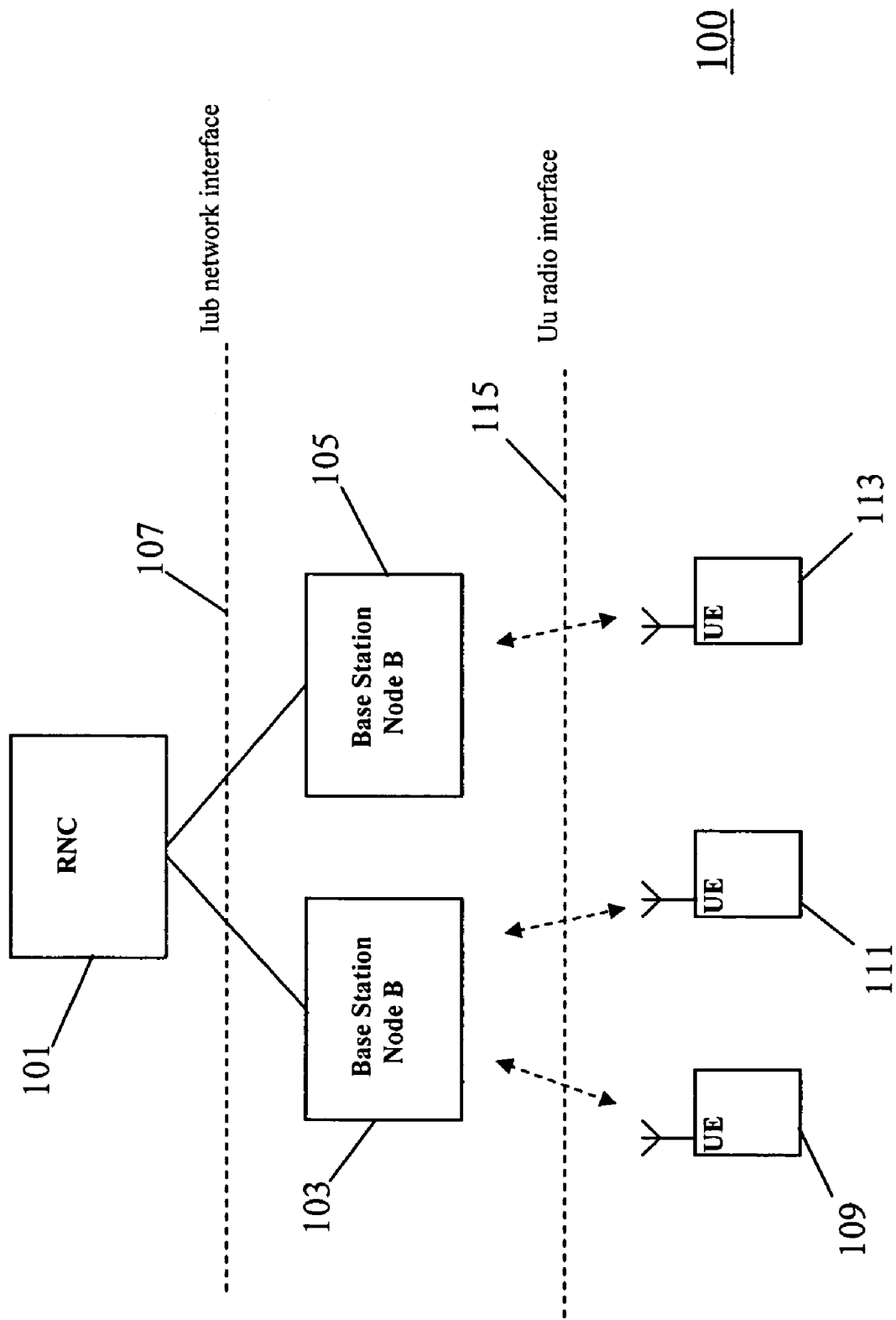
FIG. 1 is an illustration of part of a UMTS cellular communication system in accordance with embodiments of the invention.

FIG. 1 is an illustration of part of a UMTS cellular communication system 100 in accordance with embodiments of the invention.

FIG. 1 illustrates a Radio Network Controller (RNC) 101 which is connected to two base stations 103, 105 which are known as Node Bs in a UMTS cellular communication system. The interface between the RNC 101 and the base stations 103, 105 are known as the Iub interface 107. The base stations 103, 105 support a number of remote units 109, 111, 113 (or user equipment). For clarity and brevity, FIG. 1 illustrates two remote units 109, 111 being supported by the first base station 103 and one remote unit 113 being supported by the second base station 105. It will be appreciated that base stations typically support a large number of remote units in practical systems. The air interface between the base stations 103, 105 and the remote units 109, 111, 113 is in UMTS known as the Uu interface 115.

A remote unit may typically be a subscriber unit, a wireless user equipment, a mobile station, a communication terminal, a personal digital assistant, a laptop computer, an embedded communication processor or any communication element capable of communicating over the air interface.

In the example, the RNC 101 allocates a set of resources to each base station 103, 105 which can be used by the base station 103, 105 exclusively for high speed packet services. The base stations 103, 105 schedule transmissions to the remote units 109, 111, 113, operate a retransmission scheme and perform link adaptation.

In particular, the UMTS communication system 100 uses a retransmission scheme known as a Hybrid-ARQ (H-ARQ) retransmission scheme which is an enhancement of the classical ARQ protocol.

A classical ARQ protocol operates by the receiver requesting retransmission of erroneously received packets. In such a classical retransmission scheme, the initially transmitted packet is deleted from the receiving entity's memory before the retransmitted packet is received. Thus the probability of correct reception of the retransmitted packet is substantially the same as the probability of correct reception of the initially transmitted packet when radio conditions are the same for the initial transmission and the retransmission.

In contrast, when a packet is erroneously received in an H-ARQ protocol using soft combining, the receiving entity stores soft information on the reliability of the bits of the erroneously received packet and combines the soft information or the reliability of the retransmitted packet with that stored information. When the receiver decodes the combined soft information, the probability of correct reception of this combined reception is substantially greater than the probability of correct reception of the retransmitted packet on its own.

It is well known that HARQ increases system throughput when the system is operated at a high block error rate target for individual transmissions. This is achieved by the system minimising the total required transmission energy (including initial- and re-transmissions) for every data packet. By increasing the transmitted energy little-by-little, and by checking the integrity of the received data at each energy increment, the system ensures that only just-enough energy is transmitted to ensure correct reception of the packet.

Figure 2:
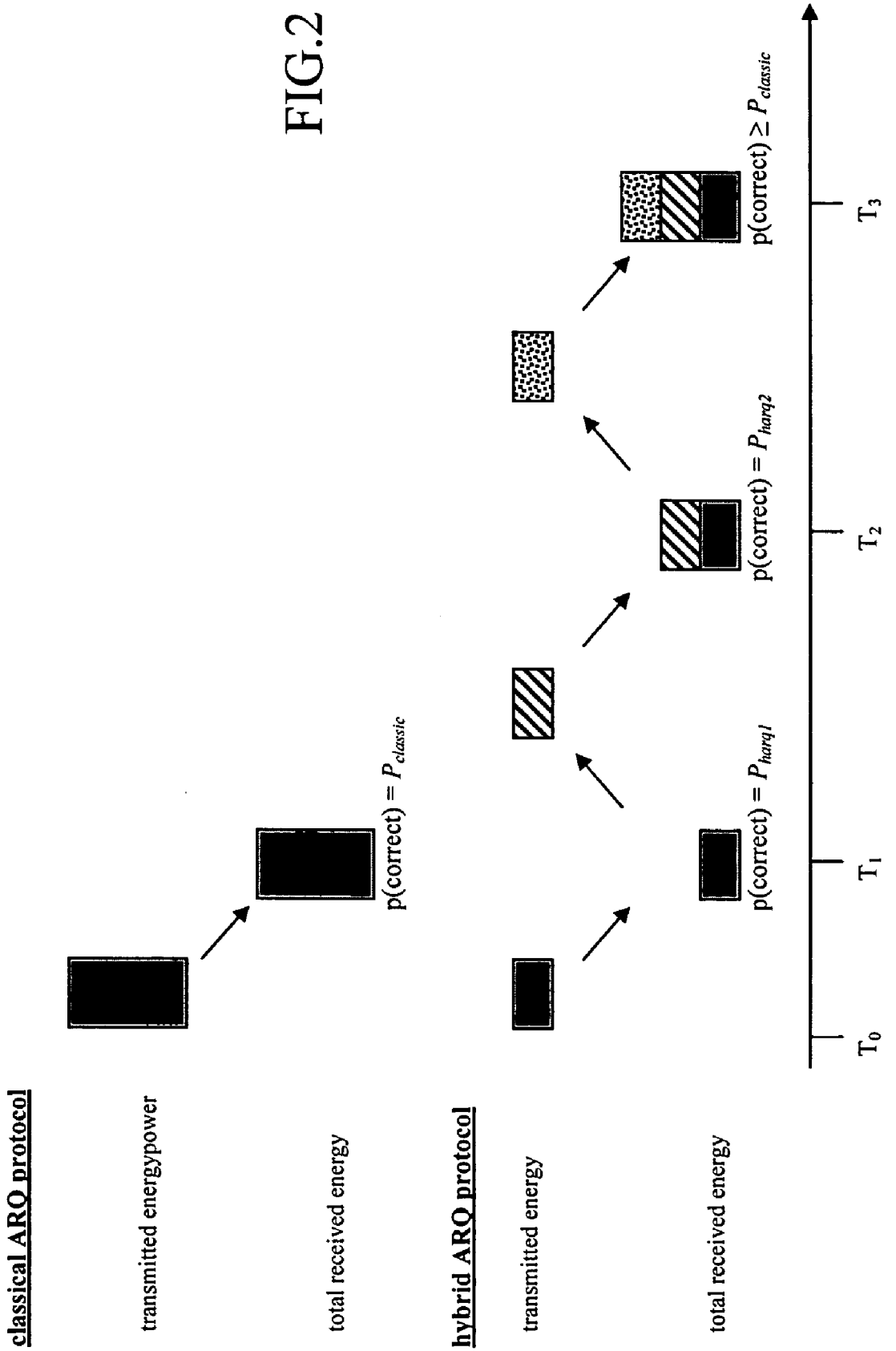
FIG. 2 illustrates an example of packet data transmission in a Hybrid ARQ retransmission scheme.

FIG. 2 illustrates an example of packet data transmission in a Hybrid ARQ retransmission scheme.

In FIG. 2, an example is illustrated where the classical ARQ protocol requires three units of transmit energy to achieve correct reception at the receiver with a probability of $P_{classic}$. This reception occurs at time $T_1$ following a transmission with the required transmit energy.

In the example of the hybrid ARQ protocol, one unit of transmit energy is used for each transmission from the base station. After the first transmission at $T_0$, the probability of correct reception is $P_{harq1}$, which is generally much less than $P_{classic}$. The H-ARQ protocol retransmits packets that are incorrectly received and the receiver collects all the energy from transmissions and retransmissions until the packet can be decoded (or the base station instructs the receiver to abandon attempts to decode the packet). Thus at time $T_2$, the receiver has received 2 units of transmit energy and is able to decode the packet correctly with a probability of $P_{harq2}$. After a third transmission, three units of transmit energy have arrived at the receiver (an identical amount of transmit energy to that which arrived at the receiver in the case of the classical ARQ protocol). The probability of correct reception for a decoding operation performed at time $T_3$ (both previous attempts have failed) is now equal to (or greater than) the probability of correct reception in the classical ARQ protocol case.

In the example, the probability of correct reception after one transmission (at time $T_1$) in the case of the H-ARQ protocol is thus $P_{harq1}$. Thus for a fraction $P_{harq1}$ of packets, only one unit of transmit energy is required for correct reception of the packet (though for a fraction $(1-P_{harq1})$, two or more units of transmit energy are required for correct reception of the packet). Hence for a fraction $(1-P_{harq1}) \cdot P_{harq2}$ of packets, two units of transmit energy are required and for a fraction $(1-P_{harq1}) \cdot (1-P_{harq2}) \cdot P_{classic}$, three units of transmit energy are required.

For example, when $P_{harq1}=0.5$, $P_{harq2}=0.9$ and $P_{classic}=0.999$, the expected transmit energy required for correct reception of a packet is (ignoring the contributions from three or more retransmissions):

$$(0.5 P_{tx}) + (0.5 \times 0.9 \times 2 P_{tx}) + (0.5 \times 0.1 \times 0.999 \times 3 P_{tx}) = 1.5498 P_{tx}$$

where $P_{tx}$ is the unit of transmit energy. The transmit energy required in the classical ARQ protocol is $3P_{tx}$ (ignoring the contribution from retransmissions).

The amount of transmit energy required for the hybrid ARQ protocol is thus almost half the energy required for the classical ARQ protocol in this example (1.5498/3=0.5166).

In a power limited system, if only half the transmit power is required to service each user, approximately twice as many users may be supported. Use of an H-ARQ protocol can thus increase capacity and throughput substantially.

However, the increased capacity is achieved at the expense of increased retransmission latency. For the specific example of FIG. 2, and assuming that $T_2 = T_1 + t$ and $T_3 = T_1 + 2t$ where t is the cycle time for retransmissions, the expected time to correct reception of the packet is:

$$0.5 \cdot (T_1 - T_0) + 0.5 \times 0.9 \times (T_1 + t - T_0) + 0.5 \times 0.1 \times 0.999 \times (T_1 + 2t - T_0) = T_1 - T_0 + 0.55 t$$

The increased latency for H-ARQ operation can thus be very significant (the cycle time, t, of the H-ARQ protocol is generally significantly larger than the time $T_1 - T_0$ since the time t includes the time required for the receiver to signal that it received a packet incorrectly back to the base station). The latency of the H-ARQ protocol can thus typically be twice that of the classical ARQ protocol, i.e. $(T_1 - T_0 + 0.55t)/T_1 - T_0) \approx 2$ for many practical values of t and $T_1 - T_0$.

Thus, the use of a hybrid ARQ retransmission scheme may result in considerably larger system capacities at the expense of increased retransmission latency. This increased system capacity and increased latency is in particular achieved for increasing block error rates of each transmission. The increase in block error rate may itself be achieved via a decrease in the power transmitted per block or an increase in the number of bits transmitted per block at a given power level.

In communication systems such as UMTS, a significant delay or latency may also result from a capacity limitation. For example, for downlink communication, when a packet is to be sent from a source the data packet is typically buffered or queued at several places in the system. E.g. a packet to be transmitted is sent from the source to an RNC. The RNC contains RLC (Radio Link Control) buffers (the RLC functionality implements a high layer ARQ protocol). Data is buffered in these RLC buffers until it can be transmitted to the scheduling function in the base station. The scheduling function is for HSDPA known as a MAC-hs (Media Access Control-hs scheduler.

The base station contains multiple MAC-hs scheduling buffers (there is at least one MAC-hs scheduling buffer for each remote unit that is to be serviced by the base station). The base station is connected to the remote units via the air interface. In HSDPA, the base station controls a shared resource: the high speed downlink shared channel (HS-DSCH). It is evident that for a given amount of data, that data will spend a longer mean time in the MAC-hs scheduling buffers when the aggregate transmission rate over the air interface is lower. Similarly, data will be buffered for a longer time in the RNC RLC buffers when the rate across the Iub interface (linking the RNC and base station) is lower. Since the rate across the Iub interface is at least partly dictated by the air interface bottleneck, the length of time that data is buffered in the RLC buffers is a function of the aggregate air interface throughput.

It is thus evident that an increased system capacity can reduce queuing latency. Thus, in communication services such as HSDPA or HSUPA, a trade off may exist between queuing latency and capacity on one side and retransmission latency on the other.

In conventional systems, the HARQ retransmission scheme is designed to operate at a high capacity by operating at a high target block error rate. In such systems, the retransmission cycle time (i.e. the time between an initial transmission and a retransmission or between retransmissions) is reduced as much as possible in order to reduce the retransmission latency. However, this remains undesirably high.

In accordance with some embodiments of the current invention, a target parameter for the retransmission scheme, such as a BLock Error Rate (BLER), is dynamically varied in response to a load characteristic.

Figure 3:
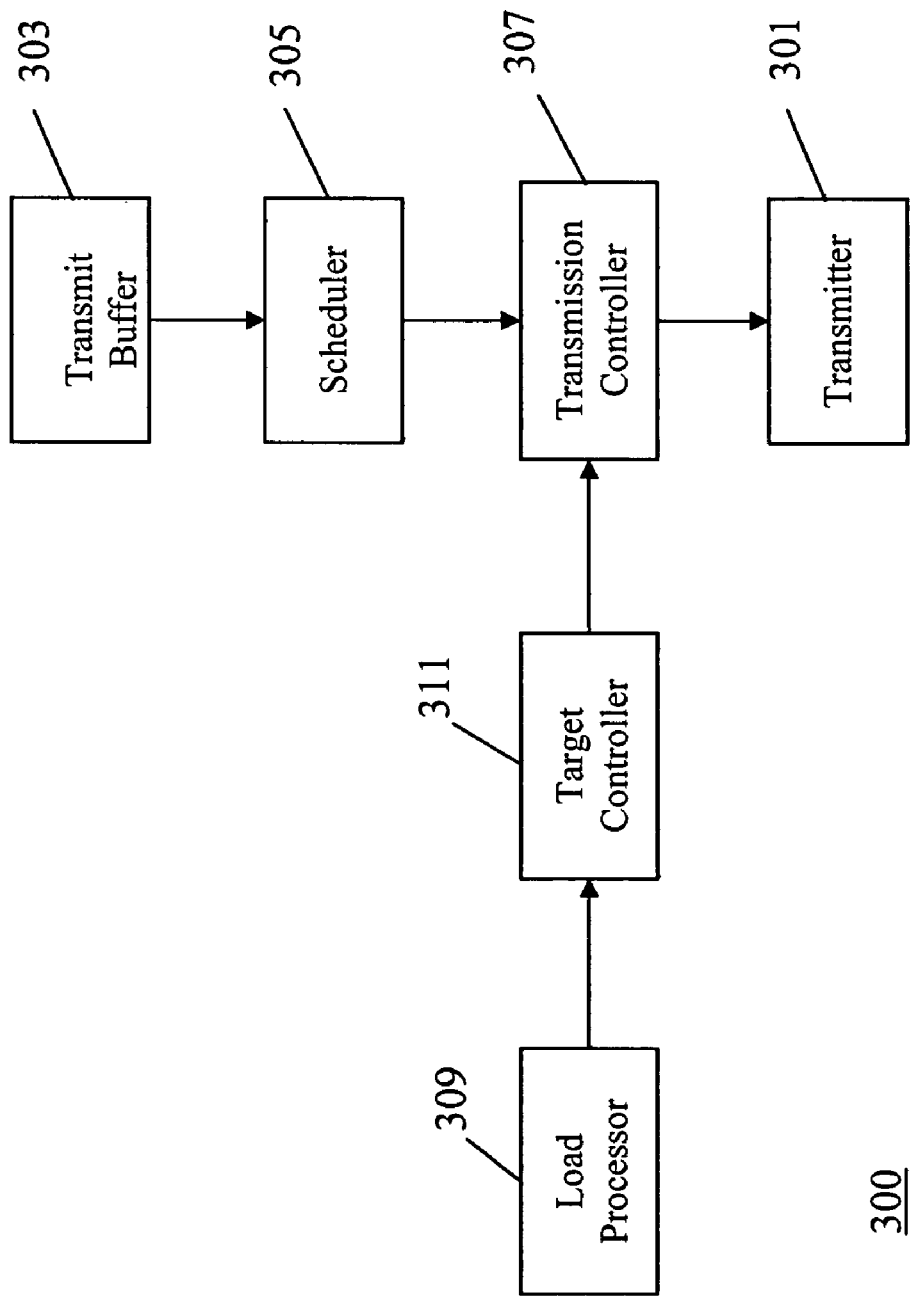
FIG. 3 illustrates an apparatus for transmission in accordance with embodiments of the invention.

FIG. 3 illustrates an apparatus 300 for transmission in accordance with embodiments of the invention.

The apparatus comprises a transmitter 301 for transmitting data packets over the air interface. The data packets may be initial data packets or may be retransmissions.

The apparatus furthermore comprises a transmit buffer 303 which receives and buffers data which is to be transmitted over the air interface by the transmitter 301.

The transmit buffer 303 is coupled to a scheduler 305 which schedules data for transmission over the air interface. The scheduled data packets are fed to a transmission controller 307 which sets parameters of the transmission by the transmitter 301 such that a desired operation is obtained. In particular, the transmission controller 307 comprises functionality for operating a retransmission scheme, such as a H-ARQ scheme. The transmission controller 307 may further comprise functionality for link adaptation. Thus, in some embodiments, the transmission controller 307 may select a given set of transmission format parameters such as a transmit power, modulation scheme, forward error correcting scheme etc.

The apparatus 300 also comprises a load processor 309 which is arranged to determine a load characteristic associated with the scheduler 305. The load characteristic indicates a loading of the cellular communication system which may affect or be affected by the scheduling performed by the scheduler. The load characteristic may for example be an indication of a current loading of the cell for which the scheduler 305 schedules data.

The load characteristic may typically be an absolute or relative load characteristic. For example, the load characteristic may indicate a loading relative to a cell capacity. The cell capacity may in some such embodiments be a predetermined static parameter or may be dynamically determined based on measurements.

The load processor 309 is coupled to a target controller 311 which is operable to set at least one target parameter for the retransmission scheme in response to the load characteristic. The target controller 311 may for example set a desired BLER for the retransmission scheme. The target controller 311 is coupled to the transmission controller 307 which is fed the target parameter. The transmission controller 307 accordingly determines at least one transmission parameter in response to the target parameter.

Hence, in embodiments according to FIG. 3, the initial transmission and retransmission operation is controlled in response to a load characteristic for the system. In other words, the scheduling function performed by the scheduler 305 and transmission controller 307 is modified as a function of the load characteristic.

It will be appreciated that although the scheduler 305 and the transmission controller 307 for clarity and brevity are shown as separate entities performing separate functions, this is merely an example. In many embodiments, the combined scheduling function performed by the scheduler 305 and the transmission controller 307 is performed by the same processing element. Also in many embodiments, the scheduling function comprises a combined scheduling of new data, scheduling of retransmission data and setting of appropriate transmission parameters.

In the example of FIG. 3, the load processor 309 and the target controller 311 generate a target parameter for the retransmission scheme which is used by the scheduling function to set at least one transmission parameter as a function of the target parameter. In particular, the load processor 309 and the transmission controller 307 may change the operating point of the retransmission scheme in response to the load characteristic.

For example, at high loads a BLER target parameter may be set to a high value. When operating with a high target block error rate, the transmitter will transmit less transmit power per data packet, but will generate more re-transmissions. This will result in increased retransmission latency but will also result in an increased resource efficiency and a higher throughput and will therefore reduce the queuing latency. As this is more significant than the retransmission latency at loads approximating saturation, a reduced overall delay is achieved at the higher load.

At low loads, a BLER target parameter may be set to a relatively low value. When operating at a low target BLER, the transmitter will transmit more power and generate fewer retransmissions. This will result in significantly reduced retransmission latency as retransmissions will only rarely be required for successful communication of a data packet. However, typically an excessive transmit power will be used thereby resulting in an excessive resource usage. However for a low loading, there is typically large amounts of unused resource which would otherwise not be used. Furthermore, as the queuing delay is typically negligible at low loads, the overall latency may be reduced substantially.

Hence, in embodiments, the target parameter may dynamically be varied to provide an improved operating point for the retransmission scheme thereby providing improved performance. In particular, the latency may be significantly reduced at low loads without affecting the capacity of the system or the latency at high loads. The overall latency may be reduced and in particular, the trade off between the queuing and retransmission latency may be dynamically adjusted to suit the current conditions. Similarly, the trade-off between capacity and/or resource usage and latency may be dynamically adjusted to or optimised for the current conditions. Thus, the throughput perceived by the individual users may be increased across a full range of system loadings.

For example, in many embodiments, queuing latency is dominant over retransmission latency at high loads and in particular when the load is approaching the available capacity. However, at low loads, retransmission latency is typically dominant over the queuing latency. According to some embodiments of FIG. 3, the target parameter may thus be adjusted to provide optimal operation for the queuing latency or for the retransmission latency. In comparison to a conventional static operation, a reduced latency may thus be achieved for both higher and lower loads than the load associated with a static operating point. In particular, at low loads, the latency may be reduced to the minimum possible latency.

FIG. 3 illustrates functional blocks of the apparatus of some embodiments of the invention. The individual functional blocks may for example be implemented in a suitable processor such as a microprocessor, a microcontroller or a digital signal processor. The functions of the illustrated blocks may for example be implemented as firmware or software routines running on suitable processors or processing platforms. However, some or all of the functional blocks may be implemented fully or partially in hardware. For example, the functional blocks may be fully or partially implemented as analog or digital circuitry or logic.

The functional blocks may furthermore be implemented separately or may be combined in any suitable way. For example, the same processor or processing platform may perform the functionality of more than one of the functional blocks. In particular, a firmware or software program of one processor may implement the functionality of two-or more of the illustrated functional blocks. For example, the load processor 309 and target controller 311 may be implemented as different firmware routines running in a single processor. The functionality of different functional modules may for example be implemented as different sections of a single firmware or software program, as different routines (e.g. subroutines) of a firmware or software program or as different firmware or software programs.

The functionality of the different functional modules may be performed sequentially or may be performed fully or partially in parallel. For example, a single firmware program may perform the operation of the load processor 309 followed by the operation of the target controller 311 followed by the operation of the scheduler 305 followed by the operation of the transmission controller 307. As another example, one processor may perform the operation of the load processor 309 and the transmission controller 307 whereas another processor (or another processing element) may perform the functionality of the scheduler and the transmission controller 307. Parallel operation may include a partial or full time overlap between the performed functions.

The buffer 303 is typically implemented by memory including dynamic or static or semi-permanent semiconductor memory. For example, the buffer may be implemented by integrated or separate Random Access Memory (RAM) or (Programmable) Read Only Memory (ROM). The buffer 303 may also fully or partially be implemented by other memory types including magnetic and/or optical memories including hard disk or optical disc based memories.

The functional elements may be implemented in the same physical or logical element and may for example be implemented in the same network element such as in an RNC, a base station or a remote unit. In other embodiments, the functionality may be distributed between different functional or logical units. For example, the load processor 309 and target controller 311 may be implemented in an RNC while the scheduler 305 and/or the transmission controller 307 and the transmitter 301 may be implemented in a base station. As another example, some functional elements may be located in fixed network of the cellular communication system whereas other elements may be located in remote units. For example, the load processor 309 and the target controller 311 may be implemented in a base station or an RNC, the scheduler 303 may be implemented in the base station while the transmit controller 307 and transmitter 301 are located in a remote unit.

The functionality of individual functional units may also be distributed between different logical or physical elements. For example, the scheduler 305 may include functionality performed by a scheduling in an RNC and a scheduling performed in a base station.

It will be appreciated that any suitable target parameter including combined target parameters comprising targets for a plurality of individual parameters may be used.

In many embodiments, an error rate target parameter may provide efficient control of the retransmission operation and allow an efficient communication. In particular, the target parameter may comprise or consist in a Block Error Rate (BLER). The BLER may specifically be a Packet Error Rate (PER) of the transmission blocks (data packets) of the retransmission scheme.

The operating point of the retransmission scheme may effectively be controlled by the BLER target parameter and in particular the BLER will provide an effective parameter for controlling the number of retransmissions and the efficiency of the resource usage. Thus, by setting a BLER target, the trade off between capacity and retransmission latency and/or between queuing latency and retransmission latency may be effectively controlled.

For example, at low loading, there are typically excess amounts of available resource. Accordingly, the target BLER may be set to a low value of e.g. $10^{-4}$ resulting in a high resource usage but in very few retransmissions and thus very low retransmission latency. As the loading is low, the queuing latency is insignificant and the total latency is thus substantially minimised. As the loading increases, the excessive resource usage results in a limited throughput which increases the queuing latency. When the loading approaches the capacity of the system (or cell), the queuing latency may increase substantially and the capacity may furthermore be limited. Accordingly, as the load increases, the BLER target may also be increased. For example, at high loads, the BLER may be set to 0.2 resulting in the resource usage being reduced for each data packet (facilitated by soft combining of retransmissions). The reduced resource usage may substantially increase the throughput of the system thereby substantially reducing the queuing delays. Hence, although the retransmission delay is increased, the capacity may be increased and the queuing latency and the total delay may be reduced.

The target parameter may for example be determined in an open loop arrangement. For example, a look up table associating values of the load characteristic with values of the target parameter may be stored in the target controller 311. This look up table may for example be determined by simulations.

In some embodiments, the target parameter may be determined in a closed loop arrangement. For example, the closed loop protocol may adjust the relationship between the load characteristic and the target parameter in order to maximise system capacity, minimise latency and/or to maximise a function of system capacity and latency. An example function would be $f_{sched}=C^{\lambda}/L^{\eta}$ where $\lambda$ and $\eta$ are adjustment parameters and C is the capacity and L is the latency.

It will be appreciated that one or more suitable transmissions parameters may be determined by the transmission controller 307 in response to the target parameter.

In many embodiments, the transmission parameter may advantageously be the error coding and modulation applied to a message which is to be transmitted. The message may for example be an initial transmission of a data packet or may be a retransmission of a data packet. The probability of a retransmission is dependent on the selected error coding and modulation and by selecting a suitable error coding and modulation, the transmission controller 307 may adjust the transmission to match the target parameter. For example, for a BLER target parameter, the transmission controller 307 may determine the error coding and modulation which for the current propagation conditions and interference level at the receiver (e.g. measured by the receiver and transmitted back to the transmitter) will result in the desired BLER.

The transmission parameter may alternatively or additionally comprise other transmission parameters. For example, the BLER of the transmitted data packet typically depends on transmit power used and the spreading ratio of the spreading code used. Hence, these parameters may in some embodiments be determined to provide the desired retransmission operating point.

In some embodiments, the transmit parameter may be a combined transmission parameter comprising a set of transmission format parameters including for example a transmit power, a modulation scheme, an error coding scheme and/or a spreading factor.

It will be appreciated that the load characteristic may be determined in accordance with any suitable algorithm and in response to any suitable parameter(s) and/or measurements.

In some embodiments, the load processor 309 determines the load characteristic in response to an amount of pending transmit data. Typically, for increasing amounts of transmit data that is to be transmitted by e.g. the transmitter 301, the queuing delays and the requirement for an efficient resource usage increases. Hence, the load processor 309 may determine an indication of how much data is to be transmitted, and the target controller 311 may set the target parameter in response thereto. For example, a BLER target may be increased for increasing amounts of pending transmit data.

The pending transmit data may be determined in response to a buffer level. For example, the load processor 309 may be coupled to the buffer 303 and may determine the load characteristic as the current buffer loading. The target controller 311 may then set the target parameter in response to the buffer loading.

In some embodiments, the pending data may be determined in response to a buffer level in an RNC and/or the buffer loading in a base station and/or the buffer loading in a remote unit. Especially, the buffer loading of RNC scheduling buffers may e.g. be used if the load processor 309 and the target controller 311 are located in an RNC. The buffer loading of base station scheduling buffers may e.g. be used if the load processor 309 and the target controller 311 are located in a base station. The buffer loading of a remote unit may for example be used for uplink communications.

The pending transmit data may in some embodiments be associated with a plurality of cells. In other embodiments, the transmit data may be associated with a single cell. This may allow an adaptation to local conditions and/or may facilitate implementation, for example when the load processor 309 and target controller 311 are implemented in a base station.

In some embodiments, the load processor 309 may additionally or alternatively determine the load characteristic in response to a number of attached remote units. The number of attached remote units may for example be a number of attached remote units which meet a specific criterion such as the number of remote units which actively request service or the number of attached remote units which are in a single cell.

The information of the number of attached remote stations in a given cell is available at the RNC and the base station serving that cell. Accordingly, this approach may be practical in embodiments wherein the load processor 309 is located in an RNC or base station. However, in other examples, the information of the number of attached users may be communicated through the interconnecting network. A remote unit is typically attached if it is registered in a non-idle state with a base station.

In the following, specific embodiments of the invention applicable to an HSUPA uplink service of a UMTS cellular communication system will be described. The embodiments are applicable to the example of FIG. 3 and will be described with reference to this.

In the embodiments, the target controller 311 modifies a BLER target for the hybrid ARQ protocol dynamically based on measurements of the offered load. In the embodiments, the offered load measurement is measured from buffer volume measurements sent to the base station by the remote unit. Between receptions of buffer volume measurements, the offered load can be interpolated by the base station.

In HSUPA, link adaptation is performed by the remote unit dynamically varying the transmit (or transport) format which is used for the transmissions. The remote unit is signalled a set of Transport Format Combinations (TFCs) which it can use for transmissions. These transport format combinations form a Transport Format Combination Set (TFCS). Each TFC in the TFCS carries a different amount of data and requires a different amount of transmit power. In current UMTS networks, the channel coding rate applied to each TFC within the TFCS is essentially the same, and hence the different TFCs within the TFCS indicate pairs of number of data bits and amounts of physical resource, but the ratio of number of bits to physical resource is essentially constant within a TFCS. In general, the concept of TFCS can be extended to allow TFCs with different coding rates within the TFCS. The power required for each TFC within the TFCS (to obtain the same probability of correct reception as all other TFCs in the TFCS) is expressed as an offset from a base power level.

Figure 4:
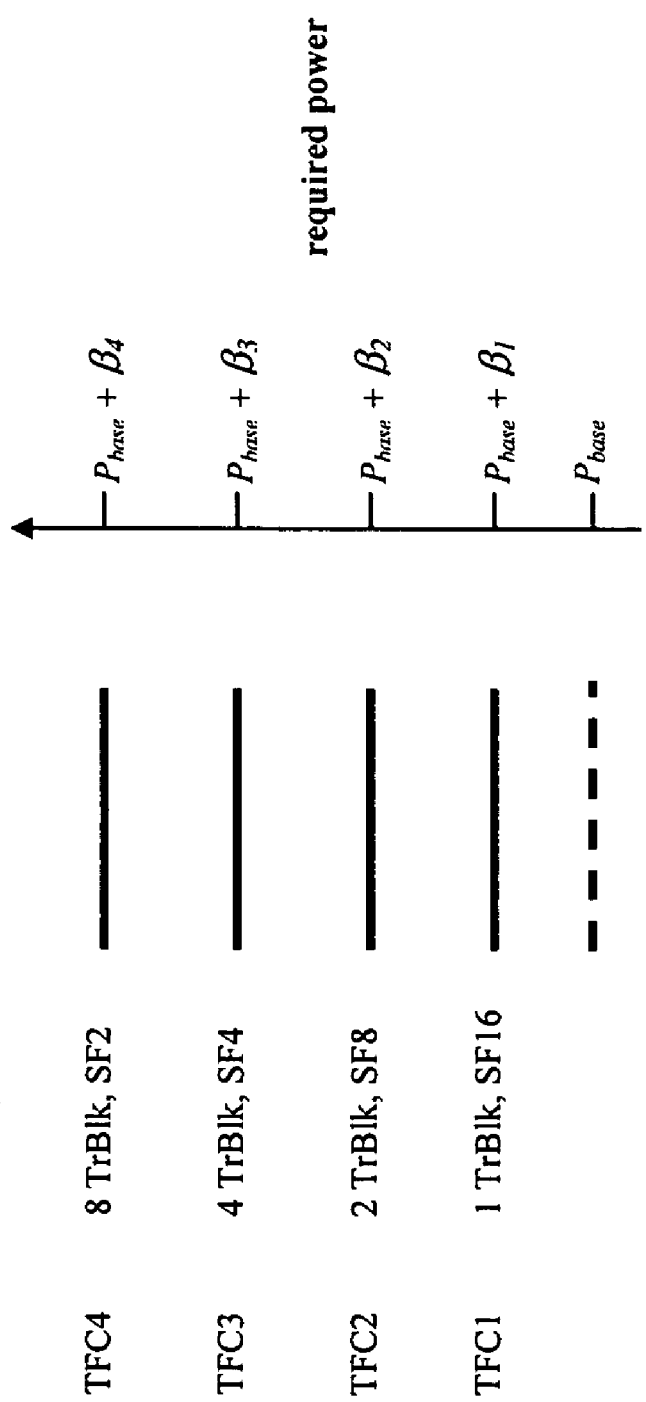
FIG. 4 illustrates an example set of transmit format combinations for a high speed packet service.

An example set of TFCs within a TFCS is shown in FIG. 4. The figure shows an example set of TFCs for a UMTS system. The coding rate of each TFC within the TFCS is the same—as more transport blocks are transmitted per TFC, the code resource of the TFC increases. The diagram shows a reference power level termed $P_{base}$ and a set of β values that are power offsets from $P_{base}$. Addition of the β values to $P_{base}$ indicates the power required to support a given TFC. The β values may either be signalled to the remote unit by the network or calculated by the remote unit.

A mobile radio channel experiences channel impairments including fading. A consequence of fading is that if the remote unit transmits at a constant power level, the power level received by the base station will fluctuate as a consequence of the fading. This fluctuation in received power level can cause several problems:

when a reduced amount of power is received from the remote unit, the signal to interference ratio of the reception may be insufficient to correctly decode the transmission.

when an increased amount of power is received from the remote unit, this increased power may interfere with transmissions from other remote units.

Power control techniques are employed in UMTS to counteract these effects. In general, a failure to respond to these power fluctuations (no power control) will increase the required transmitted energy per bit for a given block error probability.

Firstly, the network is able to signal to the remote unit a maximum TFC that the remote unit can use. Restricting the maximum TFC restricts the maximum power that the remote unit can transmit. This allows the network to ensure that an excessive amount of power is not received from a remote unit. Thus this method allows interference at the base station to be controlled.

Secondly, the network is able to control the $P_{base}$ level at the remote unit. In FDD, the base power level $P_{base}$ is changed by power control commands (TPC bits) transmitted by the network: when the network signals a TPC=down command on a downlink channel, the remote unit reduces the value of $P_{base}$ used in the uplink (similarly, when "up" is signalled, the remote unit increases the value of $P_{base}$). In TDD, the base power level $P_{base}$ is calculated by the remote unit based on a target SIR level, a base station interference level signalled by the network and a path loss measured by the remote unit (note that channel reciprocity can be assumed in TDD).

Figure 5:
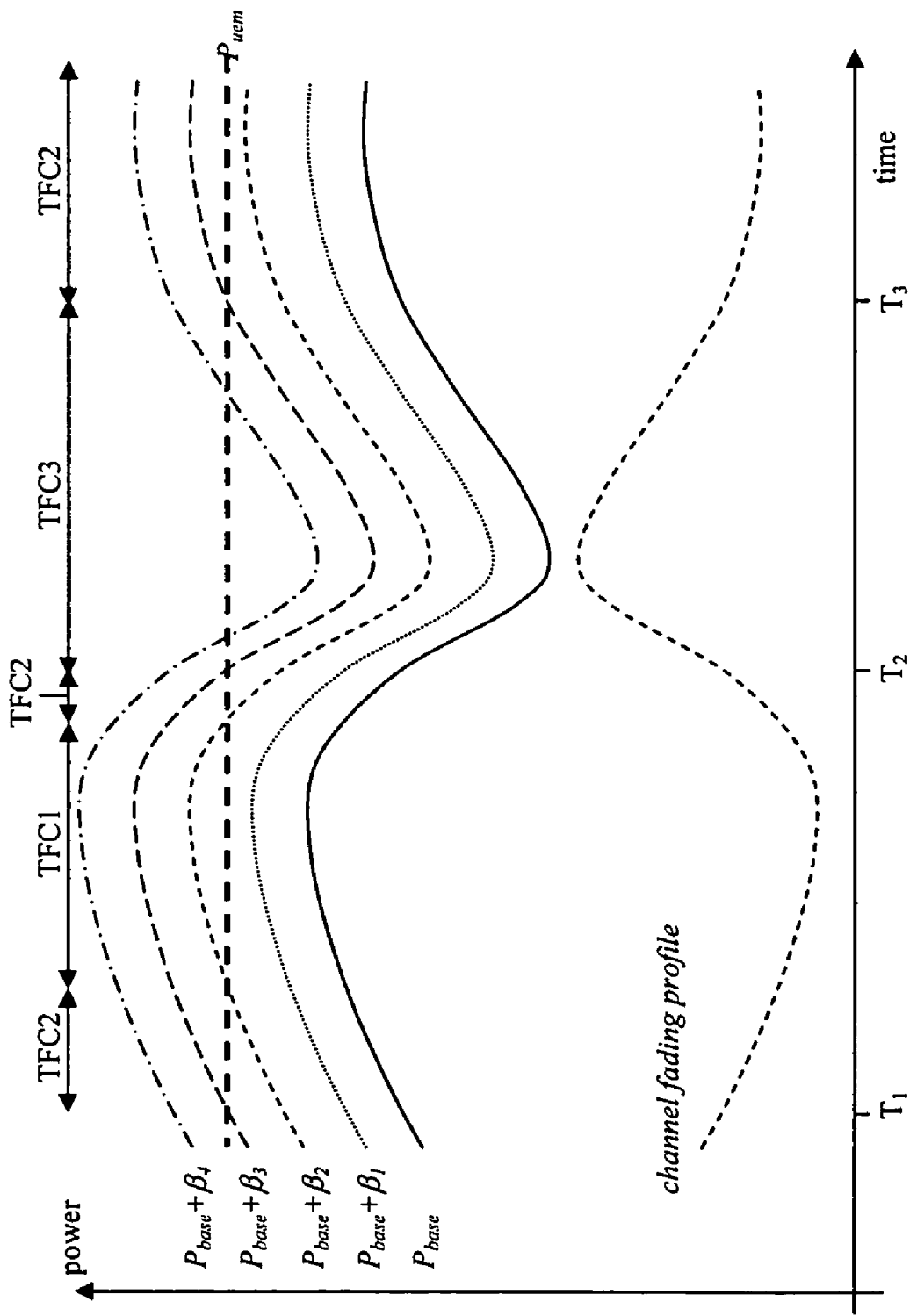
FIG. 5 illustrates an example of uplink power control for a high speed packet service.

Operation of uplink power control is shown in FIG. 5. FIG. 5 shows the channel fading profile and the corresponding value of $P_{base}$ at the remote unit. FIG. 5 also shows the powers required to transmit each of the TFCs shown in FIG. 4. FIG. 5 shows a maximum transmit power limit, $P_{uem}$, for the remote unit which is equal to the minimum of the maximum allowed transmission power (as set by the network) and the maximum power capability of the remote unit. The network may choose to reduce the maximum allowed transmit power in the presence of excessive uplink interference. The maximum transmit power capability of the remote unit is typically based on factors such as the battery power of the remote unit and the design of the transmit radio (the remote unit is typically designed to operate its radio frequency components in their linear ranges; any attempt to transmit too much power is likely to cause the RF components to operate in a non-linear range which can either damage the RF circuitry or cause the RF to radiate unwanted radio frequency emissions).

In typical system operation, the remote unit alters the TFC that it transmits according to the fading channel profile (and the hence to the changing value of $P_{base}$). In FIG. 5, the remote unit changes the TFC that it transmits between time $T_1$ and $T_2$ in order not to exceed its maximum remote unit transmit power (when the channel fading profile worsens, the remote unit reduces the TFC that it transmits and maintains maximum transmit power. It then relies on the channel coding and spreading to overcome the increasing fade depth as it maintains its power constant). Between time $T_2$ and $T_3$, the remote unit is able to use its maximum signalled TFC (TFC3: in this example, the network has disallowed use of TFC4 due to interference reasons). During this time, the remote unit reduces its transmit power in order to conserve battery power and reduce interference at the network.

Figure 6:
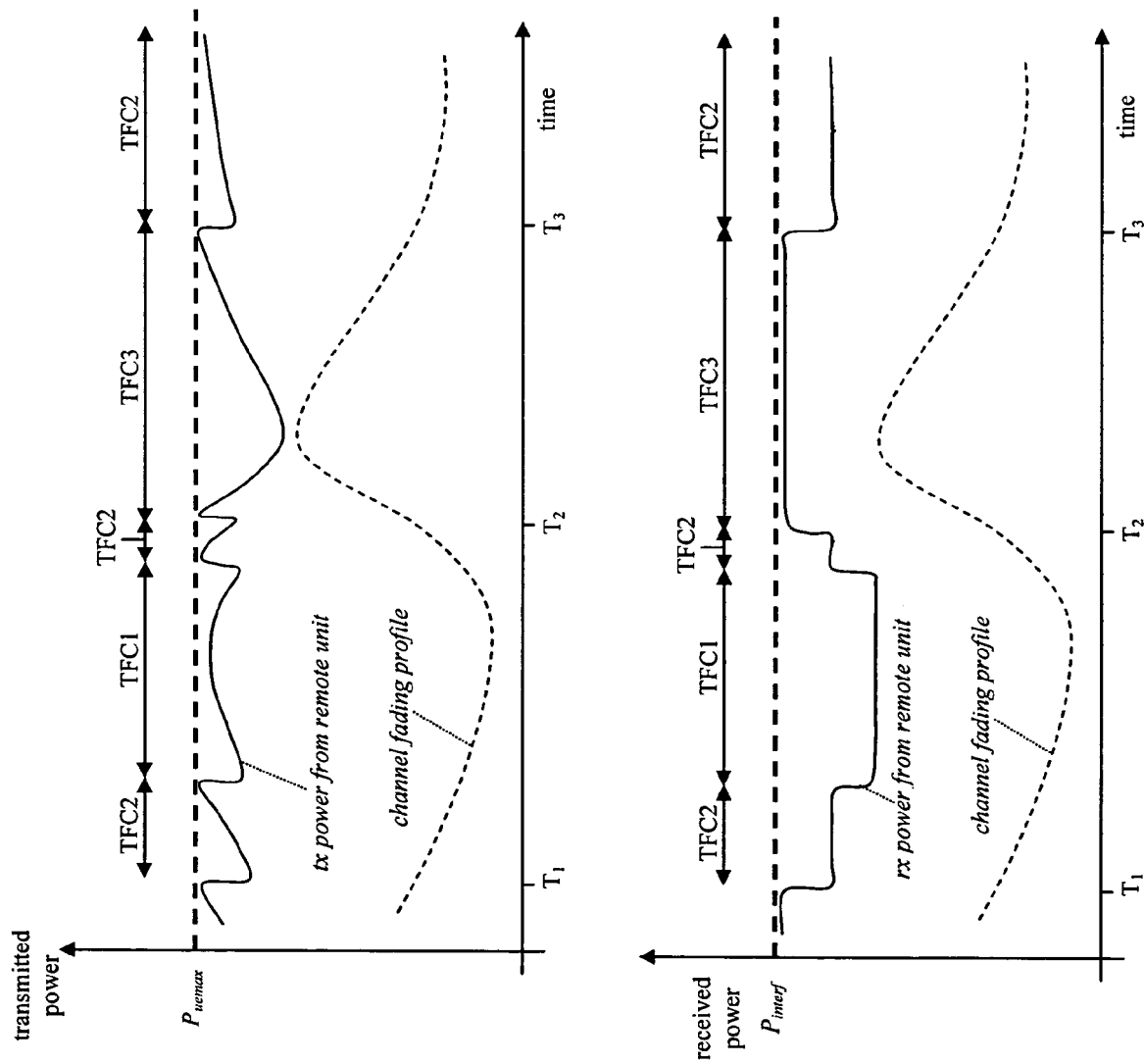
FIG. 6 illustrates an example of link adaptation.

The resultant power transmitted by the remote unit and received at the base station is shown in FIG. 6. During the period $T_1$ to $T_2$, the remote unit is transmitting at, or close to, maximum remote unit transmit power. During period T2 to T3, the remote unit transmits in its maximum allowed TFC (TFC3) and reduces the power applied to its transmission as the fade depth decreases, thus maintaining a constant received power at the base station. FIG. 6 shows that use of the restriction on maximum TFC ensures that the received power from the remote unit is below the critical value, $P_{interf}$, at which damaging interference will be caused by the remote unit received power (this damaging power can either create excessive interference in the cell in which the remote unit is transmitting or in both the cell in which the remote unit is transmitting and in neighbouring cells or only in some neighbouring cells).

In the example of FIG. 6, the remote unit changes from using TFC3 to using TFC2 at time $T_1$ due to increasing fade depth in the channel. Initially, the remote unit has more power than is required to support this TFC (it has more than enough power to support TFC2, but not enough power to support TFC3); the remote unit thus reduces its transmit power at time $T_1$. Following T1, the fade depth of the channel increases, thus the remote unit increases its transmit power towards its maximum transmit power. When the remote unit reaches its maximum transmit power, it changes TFC again to TFC1.

Note that the power received by the base station from the remote unit decreases as the remote unit switches to lower TFCs. The lower TFCs have greater inherent reliability due to increased processing gain, thus the base station is able to decode these lower TFCs despite their lower received power.

In an exemplary uplink embodiment, the scheduler 305 and transmission controller 307 operate on the basis of buffer volume measurements and other parameters such as estimates of the uplink channel quality. The buffer volume measurements indicate the amount of data that is pending for transmission in remote unit data buffers. These buffer volume measurements are signalled from the remote unit to the network. The network may estimate remote unit buffer volume in between measurement reports from the remote unit.

In the embodiment, the target controller 311 modifies a BLER target as the buffer volume measurements indicate greater offered load by remote units attached to the network. As network load increases, the target controller 311 indicates an increasing a BLER target.

In the example, a TFC restriction and a power-modifying command (such as SIR target or TPC) is sent from the transmission controller 307 in the base station to the remote unit. Hence, in the specific example, the target controller 311 and transmission controller 307 are implemented in the fixed network (including the base stations) whereas the transmitter 301 and buffer 303 are implemented in the remote unit. In the example, the link selection of the TFC used is performed by the transmitter 301 in the remote unit taking into account the restriction transmitted by the base station. The functionality of the transmission controller 307 may in some examples be distributed between the fixed network and the remote unit.

In the case of TDD (where in this section, it is assumed that the uplink power can in general be controlled either by signalling SIR target changes or by the use of TPC commands), when the block error rate target is increased, the scheduler reduces the amount of resource allocated to each remote unit since it knows that remote units will use higher coding (and potentially modulation) formats when there is a higher block error rate target. In order to increase capacity, when the network reduces the amount of resource allocated to each remote unit, it also decreases the transmission power required for any given TFC for those remote units (by lowering $P_{base}$, either by modifying an SIR target or by use of appropriate TPC commands). By reducing the amount of resource allocated to each remote unit and reducing the power for each remote unit, more remote units can be accommodated within the total resource available to the base station (where in this case, "resource" implies code/timeslot utilisation and allowed generated interference) and these remote units will be able to support the same data rate as previously (but at a higher latency). This increases system capacity at the cost of retransmission latency.

The transmission controller 307 may alternatively or additionally signal a higher TFC restriction and a lower value of $P_{base}$ to the remote unit while applying the same other resources to the transmission (where a lower value of $P_{base}$ can be signalled either by modifying an SIR target or by the use of appropriate TPC commands). This has the effect of increasing the coding rate (and potentially the modulation format) that the remote unit can use at the same transmit power (thus creating the same uplink interference in the network). Use of a higher TFC restriction and a lower value of $P_{base}$ increases the data rate that remote units can support while maintaining the same interference level at the base station at the cost of higher retransmission latency: the same number of remote units can be supported as previously but each is transmitting at a higher data rate. Use of a higher TFC restriction only increases the data rate that remote units can support but increases the interference level at the base station: the same number of remote units can be supported as previously but each is transmitting at a higher data rate.

In the case of FDD, when the block error rate target is increased, the transmission controller 307 may increase the maximum TFC restriction to the remote unit (allowing the remote unit to use higher coding rates and potentially modulations) and lower the value of $P_{base}$ that the remote unit operates at (this may be achieved by sending extra "down" TPC commands to the remote unit). By sending these extra "down" TPC commands and increasing the maximum TFC for the remote unit, the base station causes the remote unit to transmit at a higher coding rate (and potentially modulation) while creating the same amount of interference as when the lower block error rate target is employed.

The transmission controller 307 may alternatively increase the TFC restriction while maintaining the $P_{base}$ restriction. This alternative has the effect of allowing the remote unit to transmit at a higher power. These higher power transmissions create more interference at the base stations and have the effect of increasing the BLER in the network. In this case, the same number of remote units can be supported as previously, but each is transmitting at a higher data rate at the cost of a higher retransmission latency.

As an alternative, in FDD, the base station can maintain the maximum TFC restriction when it increases the BLER target and lowers the value of $P_{base}$ that the remote unit operates at. This alternative has the effect of reducing the interference that any one remote unit creates and allows the base station to support more remote units for the same total amount of base station interference.

Thus, the transmission controller 307 may determine a transmit power reference indication, such as $P_{base}$, and use this to control the retransmission operation. Additionally or alternatively, the transmission controller 307 may determine a transmission parameter set restriction, such as a restriction of the TFCs which may be used by the remote unit, and use this to control the retransmission operation.

Figure 7:
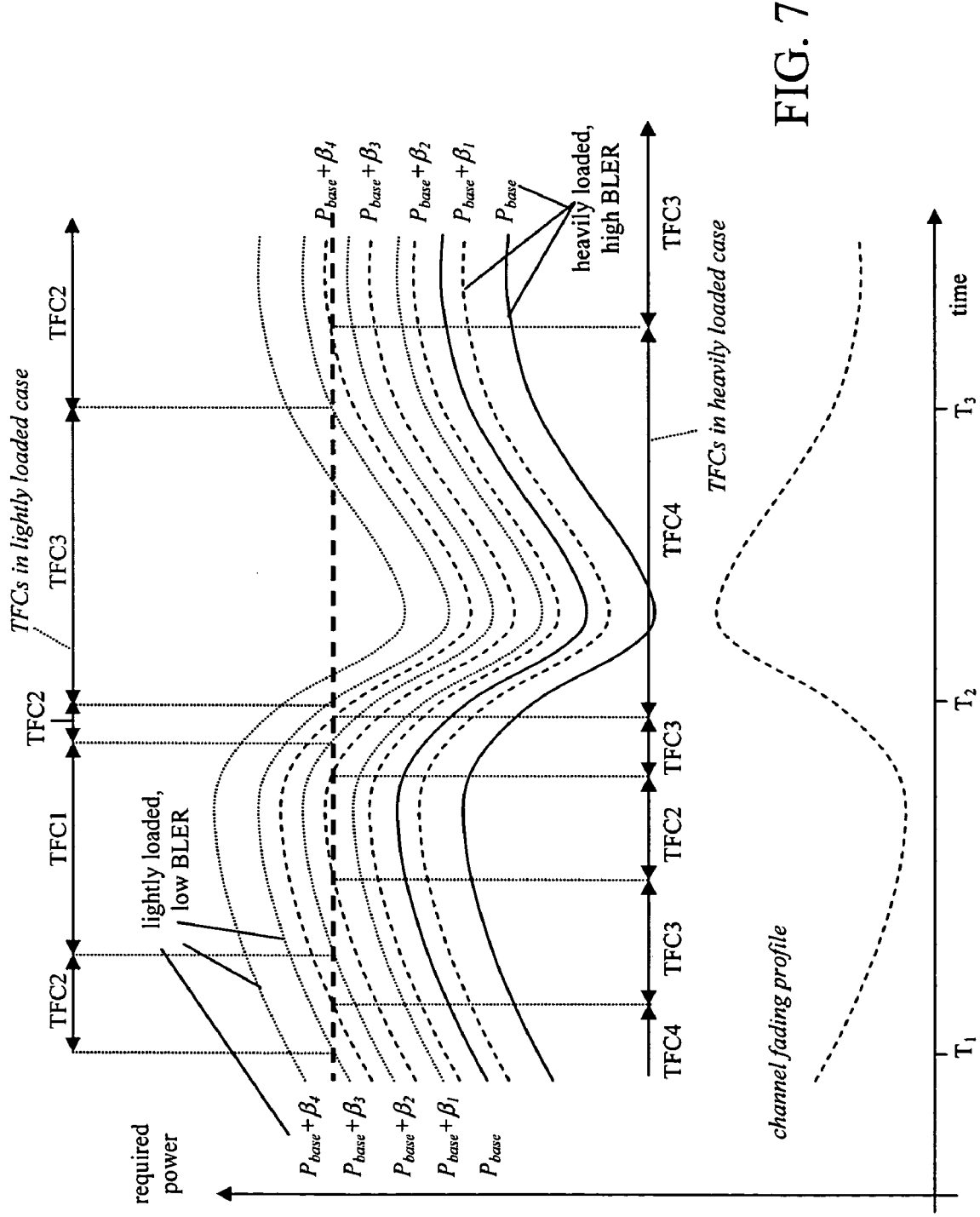
FIG. 7 illustrates an example of an operation of uplink power control in accordance with embodiments of the invention.

FIG. 7 illustrates an example of an operation of uplink power control in accordance with the example. In particular, FIG. 7 illustrates operation of uplink power control in both the lightly loaded case (low BLER, high $P_{base}$) and in the heavily loaded case (high BLER, low $P_{base}$). The value of $P_{base}$ is altered in the network by the methods described previously (by lowering the SIR target or by sending extra "down" TPC commands to the remote unit). In FIG. 7, the maximum TFC for the lightly loaded case is TFC3 and for the heavily loaded case it is TFC4.

FIG. 7 illustrates that when the value of $P_{base}$ is reduced by the network (in the heavily loaded case), the TFCs that are used by the remote unit increase. Note also that the remote unit is able to transmit using TFC4 at a greater fade depth than it could transmit using TFC3 in the lightly loaded case: this justifies the network decision to increase the TFC restriction from TFC3 to TFC4 (in addition to lowering $P_{base}$) when the network loading increases.

Figure 8:
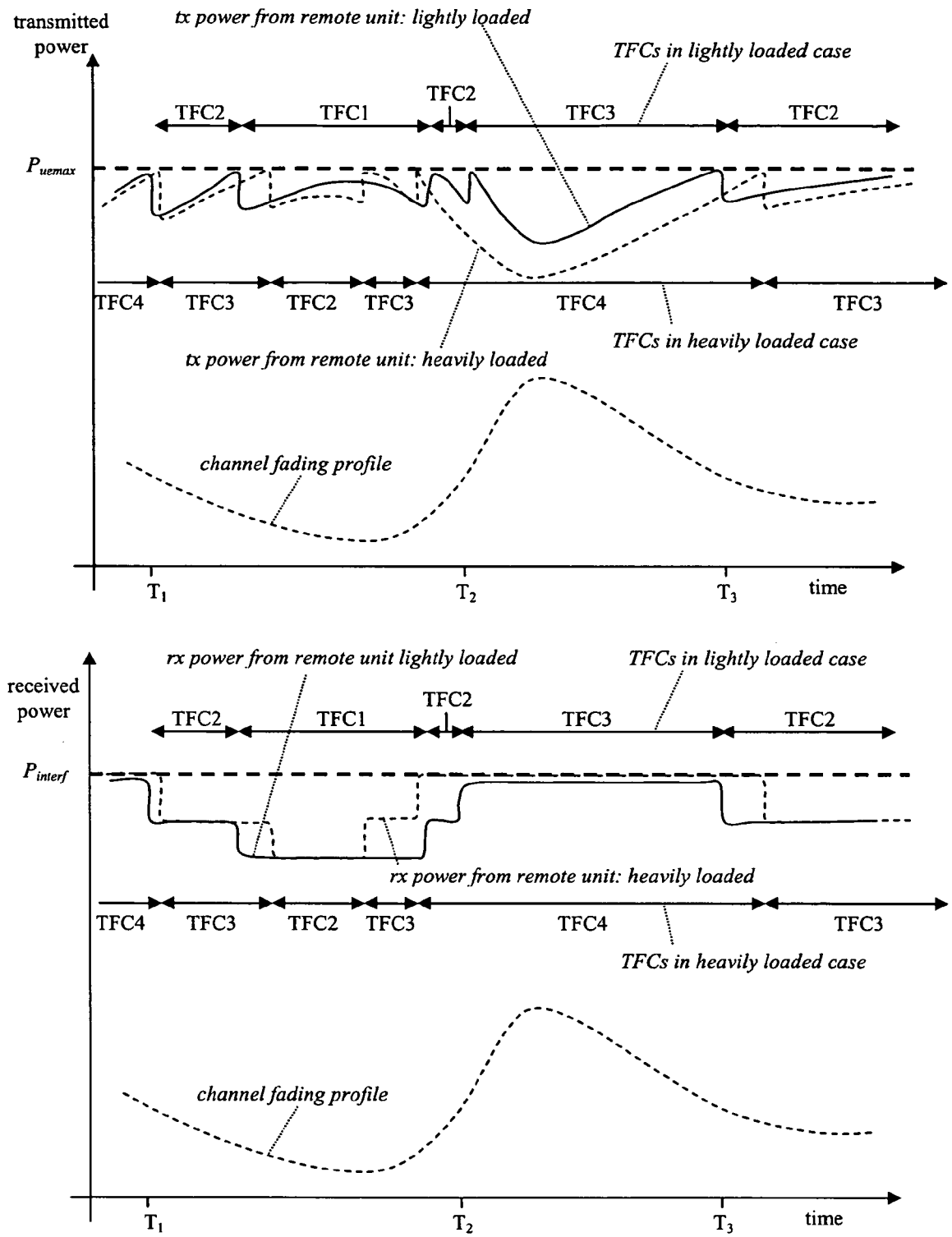
FIG. 8 illustrates an example of transmit and receive powers in an exemplary embodiment of the invention.

FIG. 8 illustrates the transmit and receive powers at the remote unit according to the example. In particular, FIG. 8 shows the lightly loaded case when the target controller 311 sets a low BLER target (and high $P_{base}$) and the heavily loaded case when the target controller 311 sets a high BLER target (and low $P_{base}$). It can be seen that in the heavily loaded case, a higher TFC is typically used than in the lightly loaded case under the same channel conditions. Use of this higher TFC does not increase interference in the system since this higher TFC (e.g. TFC4) is transmitted at the same power in the heavily loaded system (with low $P_{base}$) as a lower TFC (e.g. TFC3) in the lightly loaded system. However, an increased amount of data may be transmitted at the higher TFC.

FIG. 8 illustrates that the received power at any given TFC is lower in the heavily loaded system. The BLER of the heavily loaded system is thus greater than that of the lightly loaded system.

It should be noted that FIG. 8 illustrates the method of increasing system capacity by raising the maximum TFC restriction. If the maximum TFC restriction were not increased (for example, if a maximum TFC of TFC3 were used), then the power received from the remote unit by the base station would be less in the heavily loaded system than in the lightly loaded system. The lower received power from the remote unit would create less interference at the base station. Since each remote unit would create less interference in the heavily loaded system (operating at a lower $P_{base}$), the base station could admit more users onto the system before a critical level of interference is reached at the base station.

In some uplink embodiments, the target controller 311 may be implemented in the fixed network and the transmission controller 307 may be fully or partially implemented in the remote unit. In such embodiments, the base station may explicitly signal to the remote unit that a change in H-ARQ operating point is to be applied (the remote unit may thus be in control of the setting of the H-ARQ operating point).

Specifically, the network may signal to the remote unit that a new BLER target is to be applied. This signalling may for example in a UMTS system be by RRC signalling from the RNC in the network or by lower layer (MAC or PHY layer) fast signalling from the network (typically the base station).

In the following, specific embodiments of the invention applicable to an HSDPA downlink service of a UMTS cellular communication system will be described. The embodiments are applicable to the example of FIG. 3 and will be described with reference to this.

In the example, the apparatus seeks to provide maximum capacity and minimum latency for a HSDPA service. In the example, the target controller 311 varies the BLER target as the offered load in the system changes. The offered load may be measured either as the number of admitted users or the amount of data that is stored in the network's buffers (base station and/or RNC buffers).

Specifically the BLER target may be varied as a function of the total amount of data buffered in the base station. The BLER target can be modified dynamically as the measure of buffered data changes (for example, during busy hours, there may be more buffered data and the target controller 311 will increase the BLER target in order to increase throughput). The relationship between the amount of buffered data and BLER target is carefully calculated (either off-line and a-priori, or dynamically within the base station) to substantially minimise the latency across users and hence maximise the throughput perceived by them.

Figure 9:
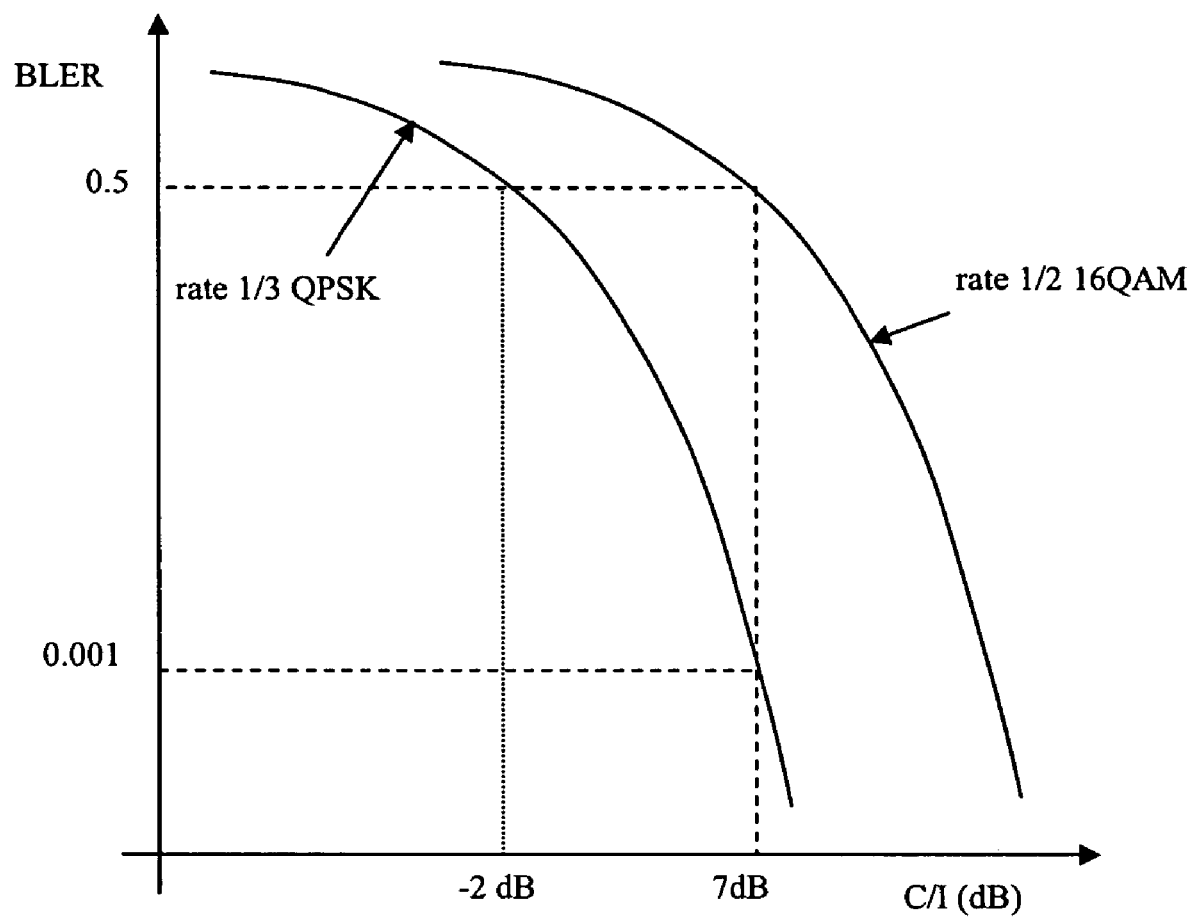
FIG. 9 illustrates an example of a block error rate as a function of signal to interference ratio.

A typical block error rate vs C/I (signal to interference ratio) curve is shown in FIG. 9.

As a specific example, when a cell is lightly loaded, the target controller 311 will (for example) signal a block error rate target of 0.001 to be used by the transmission controller 307. If the channel C/I is 7 dB, rate ⅓ QPSK is used. Although this is a low coding rate and modulation format, this is acceptable since the scheduler 305 and transmission controller 307 can allocate a lot of physical resource (codes and timeslots) to the remote unit in order to satisfy the data rate requirements of the remote unit as there is little load on the network (if the physical resources were not allocated to this remote unit, they would not be allocated at all since there are no other remote units requesting service in the lightly loaded example). Use of a block error rate target of 0.001 minimises latency since most packets are received correctly by the remote unit at the first attempt.

However, in the example, when the cell is heavily loaded, the target controller 311 increases the BLER target to 0.5. When the channel C/I is 7 dB, rate ½ 16QAM is used. Note that for any given amount of physical resource, three times the number of bits can be transmitted with rate ½ 16QAM than can be transmitted with rate ⅓ QPSK. Use of this high coding rate and modulation minimises the amount of physical resource required to transmit the packet. This increases system capacity and increases latency due to re-transmissions but can reduce queuing latency.

It will be appreciated that it is also possible to operate the system such that when the block error rate target is increased from 0.001 (channel C/I=7 dB, rate ⅓ QPSK) to 0.5, the power applied to the code may be decreased to −2 dB while maintaining the rate ⅓ QPSK coding and modulation scheme.

It will be appreciated that the specific operating points described are examples only and that it is of course possible to use different operating points to those described here. Indeed, it is possible for the target controller 311 to dynamically change the BLER target over a continuous range. Additionally, other system parameters or metrics than a BLER target may be used to control the transmission error probabilities.

In some embodiments, the target controller 311 may further be operable to set the target parameter in response to a performance characteristic. For example, a performance of a given service may be measured and used to adjust the target parameter. As an example, the RNC can measure the elapsed time between data packets being received in the RNC transmit buffers and acknowledgements of correct receipt of these packets being received from the remote units (this performance characteristic is a latency measurement). The RNC then feeds these latency measurements into a control loop that adjusts the target parameter with a view to minimising the measured latency. The RNC may then signal this target parameter to the base station.

In some embodiments, target parameters or load characteristics associated with one cell, base station or scheduler may be communicated to scheduling functions with other cells, base stations or schedulers.

For example, the apparatus 300 may be implemented in a first base station and may control the retransmission operation within a first cell served by the base station. However, a similar functionality may be implemented in a second base station for controlling the retransmission operation within a second cell served by the second base station. In such a case, the load characteristics and/or the target parameter may be exchanged between the base stations. This may allow the setting of the target parameter in one cell to be dependent on the characteristics in another cell.

Especially, if the first and second cells are neighbouring cells, the radio environment of one cell will affect the other cell. For example, excessive resource usage in one cell may introduce excessive interference to the other cell thereby reducing the capacity and possibly increasing queuing lengths. Hence, by increasing a BLER target in one cell in response to a load characteristic in another cell the latency in the other cell may be reduced or the capacity increased.

In some such embodiments, signalling may be established between base stations to indicate that a given absolute or relative target parameter is to be used. An algorithm may be implemented to allow base stations to come to an agreement on the target parameter to be used. The communication may be directly from base station to base station or may be via the RNC.

In some embodiments, an RNC may signal to a plurality of base stations to operate with a given absolute or relative target parameter. For example, in response to an increasing load indication determined at an RNC for a plurality of cells, the RNC may signal a higher BLER target to all the cells served by the RNC thereby improving the resource efficiency and interference in all cells.

In some embodiments, a remote unit may receive signals from or transmit signals to a plurality of base stations. For example, a remote unit may be in a soft handover. In situations where the target parameter is transmitted from the base stations to the remote unit, the remote unit may be operable only to change the target parameter used if a sufficient number of receptions from the plurality of base stations are in agreement. For example, it may only change the target parameter if all or a majority of received target parameters are identical. A similar approach may be applied to transmissions from the remote unit.

It will be appreciated that the above description for clarity has described embodiments of the invention with reference to different functional units and processors. However, it will be apparent that any suitable distribution of functionality between different functional units or processors may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination of these. However, preferably, the invention is implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with a particular embodiment, one skilled in the art would recognize that various features of the described embodiments may be combined in accordance with the invention. In the claims, the term comprising does not exclude the presence of other elements or steps. Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. In addition, singular references do not exclude a plurality. Thus references to "a", "an", "first", "second" etc do not preclude a plurality.

What is claimed is:

1. An apparatus for a cellular communication system, the apparatus comprising:
   a scheduler for scheduling data for transmission over an air interface of the cellular communication system using a retransmission scheme for affecting at least a retransmission probability and a resource usage;
   load means for determining a load characteristic associated with the scheduler;
   means for setting a target parameter for the retransmission scheme in response to the load characteristic; and
   means for setting a transmission parameter for a transmission in response to the target parameter for affecting at least the retransmission probability and the resource usage according to the load characteristic, wherein the resource usage is related to the retransmission probability.

2. The apparatus according to claim 1 wherein the transmission parameter comprises a message transmit power.

3. The apparatus according to claim 1 wherein the transmission parameter comprises a transmit power reference indication.

4. The apparatus according to claim 1 wherein the target parameter comprises an error rate.

5. The apparatus according to claim 4 wherein the error rate is a Block Error Rate (BLER).

6. The apparatus according to claim 1 wherein the transmission parameter comprises a modulation parameter.

7. The apparatus according to claim 1 wherein the transmission parameter comprises an error coding parameter.

8. The apparatus according to claim 1 wherein the transmission parameter comprises a transmission parameter set restriction.

9. The apparatus according to claim 1 wherein the transmission parameter is a transmission parameter of an initial transmission of a message.

10. The apparatus according to claim 1 wherein the probability of a retransmission is dependent on the setting of the transmission parameter.

11. The apparatus according to claim 1 wherein the load means is operable to determine the load characteristic in response to an amount of pending transmit data.

12. The apparatus according to claim 11 wherein the pending transmit data is associated with a single cell.

13. The apparatus according to claim 12 wherein the pending transmit data is associated with a radio controller common for a plurality of cells.

14. The apparatus according to any one of the claims 11, 12, and 13 wherein the amount of pending data corresponds to a transmit data buffer loading.

15. The apparatus according to claim 1 wherein the load means is operable to determine the load characteristic in response to a number of attached remote units.

16. The apparatus according to claim 1 wherein the transmission parameter is biased towards an increasing number of retransmissions for an increasing load.

17. The apparatus according to claim 1 further comprising means for measuring a performance characteristic; and wherein the means for setting the target parameter is further operable to set the target parameter in response to the performance characteristic.

18. The apparatus according to claim 1 wherein the transmission is a downlink transmission.

19. The apparatus according to claim 1 wherein the transmission is an uplink transmission.

20. The apparatus according to claim 19 wherein the load means is operable to determine the load characteristic in response to a load indication received from a remote unit.

21. The apparatus according to claim 19 further comprising means for transmitting an indication of the target parameter from a base station to a remote unit.

22. The apparatus according to claim 19 further comprising means for transmitting an indication of the transmission parameter from a base station to a remote station.

23. The apparatus according to claim 1 wherein the means for setting the transmission parameter is comprised in a base station, and the means for setting the target parameter is comprised in a radio network controller which is operable to communicate an indication of the target parameter to the base station.

24. The apparatus according to claim 1 further comprising means for communicating the target parameter to a scheduling function associated with a different cell than a cell associated with the means for determining the target parameter.

25. The apparatus according to claim 1 further comprising means for communicating the load characteristic to a scheduling function associated with a different cell than the means for determining the load characteristic parameter.

26. The apparatus according to claim 1 wherein the retransmission scheme is a Hybrid-Automatic Repeat reQuest (H-ARQ) scheme.

27. The apparatus according to claim 1 wherein the cellular communication system complies with the Technical Specifications of the $3^{rd}$ Generation Partnership Project (3GPP).

28. The apparatus according to claim 1, wherein the transmission parameter increases resource usage and decreases retransmission probability.

29. The apparatus according to claim 28, wherein the target parameter was set in response to a low load characteristic.

30. The apparatus according to claim 1, wherein the transmission parameter decreases resource usage and increases retransmission probability.

31. The apparatus according to claim 30, wherein the target parameter was set in response to a high load characteristic.

32. A base station for a cellular communication system; the base station comprising:

a scheduler for scheduling data for transmission over an air interface of the cellular communication system using a retransmission scheme for affecting at least a retransmission probability and a resource usage;

load means for determining a load characteristic associated with the scheduler;

means for setting a target parameter for the retransmission scheme in response to the load characteristic; and means for setting a transmission parameter for a transmission in response to the target parameter for affecting at least the retransmission probability and the resource usage according to the load characteristic, wherein the resource usage is related to the retransmission probability.

33. A method of operation in a cellular communication system including at least a scheduler for scheduling data for transmission over an air interface of the cellular communication system using a retransmission scheme for affecting at least a retransmission probability and a resource usage, the method comprising:

determining a load characteristic associated with the scheduler;

setting a target parameter for the retransmission scheme in response to the load characteristic; and setting a transmission parameter for a transmission in response to the target parameter for affecting at least the retransmission probability and the resource usage according to the load characteristic, wherein the resource usage is related to the retransmission probability.

34. The method according to claim 33 wherein the transmission parameter comprises a message transmit power.

35. The method according to claim 33 wherein the transmission parameter comprises a transmit power reference indication.

36. The method according to claim 33 wherein the target parameter comprises an error rate.

37. The method according to claim 36 wherein the error rate is a Block Error Rate (BLER).

38. The method according to claim 33 wherein the transmission parameter comprises a modulation parameter.

39. The method according to claim 33 wherein the transmission parameter comprises an error coding parameter.

40. The method according to claim 33 wherein the transmission parameter comprises a transmission parameter set restriction.

41. The method according to claim 33 wherein the transmission parameter is a transmission parameter of an initial transmission of a message.

42. The method according to claim 41 wherein the probability of a retransmission is dependent on the setting of the transmission parameter.

43. The method according to claim 33 wherein the determining of the load characteristic comprises determining the load characteristic in response to an amount of pending transmit data.

44. The method according to claim 43 wherein the pending transmit data is associated with a single cell.

45. The method according to claim 44 wherein the pending transmit data is associated with a radio controller common for a plurality of cells.

46. The method claimed in any previous according to claim 43 wherein the amount of pending data corresponds to a transmit data buffer loading.

47. The method according to claim 33 wherein the determining of the load characteristic comprises determining the load characteristic in response to a number of attached remote units.

48. The method according to claim 33 wherein the transmission parameter is biased towards an increasing number of retransmissions for an increasing load.

49. The method according to claim 33 further comprising measuring a performance characteristic; and wherein the setting of the target parameter comprises setting the target parameter in response to the performance characteristic.

50. The method according to claim 33 wherein the transmission is a downlink transmission.

51. The method according to claim 33 wherein the transmission is an uplink transmission.

52. The method according to claim 51 wherein the determining of the load characteristic comprises determining the load characteristic in response to a load indication received from a remote unit.

53. The method according to claim 51 further comprising transmitting an indication of the target parameter from a base station to a remote unit.

54. The method according to claim 51 further comprising transmitting an indication of the transmission parameter from a base station to a remote station.

55. The method according to claim 33 wherein the setting of the transmission parameter is performed by a base station, and the setting of the target parameter is performed by a radio network controller which further communicates an indication of the target parameter to the base station.

56. The method according to claim 33 further comprising communicating the target parameter to a scheduling function associated with a different cell than a cell associated with the determining of the target parameter.

57. The method according to claim 33 further comprising communicating the load characteristic to a scheduling function associated with a different cell than the determining of the load characteristic parameter.

58. The method according to claim 33 wherein the retransmission scheme is a Hybrid-Automatic Repeat reQuest (H-ARQ) scheme.

59. The method according to claim 33 wherein the cellular communication system complies with the Technical Specifications of the $3^{rd}$ Generation Partnership Project (3GPP).

60. A computer-readable medium storing executable instructions for operation in a cellular communication system including at least a scheduler for scheduling data for transmission over an air interface of the cellular communication system using a retransmission scheme for affecting at least a retransmission probability and a resource usage, comprising instructions for:

determining a load characteristic associated with the scheduler;

setting a target parameter for the retransmission scheme in response to the load characteristic; and setting a transmission parameter for a transmission in response to the target parameter for affecting at least the retransmission probability and the resource usage according to the load characteristic, wherein the resource usage is related to the retransmission probability.

61. A record carrier comprising a computer program according to claim 60.

62. An apparatus for a cellular communication system, the apparatus comprising:

a scheduler for scheduling data for transmission over an air interface of the cellular communication system using a retransmission scheme for affecting at least a retransmission probability and a resource usage;

load means for receiving a load characteristic associated with the scheduler;

means for setting a target parameter for the retransmission scheme in response to the load characteristic; and means for setting a transmission parameter for a transmission in response to the target parameter for affecting at least the retransmission probability and the resource usage according to the load characteristic, wherein the resource usage is related to the retransmission probability.

63. An apparatus for a cellular communication system, the apparatus comprising:

a scheduler for scheduling data for transmission over an air interface of the cellular communication system using a retransmission scheme for affecting at least a retransmission probability and a resource usage;

means for receiving a target parameter for the retransmission scheme, the target parameter being dependent on a load characteristic associated with the scheduler; and means for setting a transmission parameter for a transmission in response to the target parameter for affecting at least the retransmission probability and the resource usage according to the load characteristic, wherein the resource usage is related to the retransmission probability.

64. An apparatus for a cellular communication system including a scheduler for scheduling data for transmission over an air interface of the cellular communication system using a retransmission scheme for affecting at least a retransmission probability and a resource usage, the apparatus comprising:

load means for receiving a load characteristic associated with the scheduler;

means for setting a target parameter for the retransmission scheme in response to the load characteristic; and means for setting a transmission parameter for a transmission in response to the target parameter for affecting at least the retransmission probability and the resource usage according to the load characteristic, wherein the resource usage is related to the retransmission probability.

65. An apparatus for a cellular communication system including a scheduler for scheduling data for transmission over an air interface of the cellular communication system using a retransmission scheme for affecting at least a retransmission probability and a resource usage, the apparatus comprising:

means for receiving a target parameter for the retransmission scheme, the target parameter being dependent on a load characteristic associated with the scheduler; and means for setting a transmission parameter for a transmission in response to the target parameter for affecting at least the retransmission probability and the resource usage according to the load characteristic, wherein the resource usage is related to the retransmission probability.

66. An apparatus for a cellular communication system including a scheduler for scheduling data for transmission over an air interface of the cellular communication system using a retransmission scheme for affecting at least a retransmission probability and a resource usage, the apparatus comprising:

load means for receiving a load characteristic associated with the scheduler; and means for setting a target parameter for the retransmission scheme in response to the load characteristic, the target parameter being indicative of a setting of a transmission parameter for a transmission for affecting at least the retransmission probability and the resource usage according to the load characteristic, wherein the resource usage is related to the retransmission probability.

67. A method for a cellular communication system including a scheduler for scheduling data for transmission over an air interface of the cellular communication system using a retransmission scheme for affecting at least a retransmission probability and a resource usage, the method comprising:

receiving a load characteristic associated with the scheduler;

setting a target parameter for the retransmission scheme in response to the load characteristic; and setting a transmission parameter for a transmission in response to the target parameter for affecting at least the retransmission probability and the resource usage according to the load characteristic, wherein the resource usage is related to the retransmission probability.

68. A method for a cellular communication system including a scheduler for scheduling data for transmission over an air interface of the cellular communication system using a retransmission scheme for affecting at least a retransmission probability and a resource usage, the method comprising:

receiving a target parameter for the retransmission scheme, the target parameter being dependent on a load characteristic associated with the scheduler; and setting a transmission parameter for a transmission in response to the target parameter for affecting at least the retransmission probability and the resource usage according to the load characteristic, wherein the resource usage is related to the retransmission probability.

69. A method for a cellular communication system including a scheduler for scheduling data for transmission over an air interface of the cellular communication system using a retransmission scheme for affecting at least a retransmission probability and a resource usage, the method comprising:

determining a load characteristic associated with the scheduler; and setting a target parameter for the retransmission scheme in response to the load characteristic, the target parameter being indicative of a setting of a transmission parameter for a transmission for affecting at least the retransmission probability and the resource usage according to the load characteristic, wherein the resource usage is related to the retransmission probability.

* * * * *

UNITED STATES PATENT AND TRADEMARK OFFICE
CERTIFICATE OF CORRECTION

| | | |
|---|---|---|
| PATENT NO. | : 7,292,825 B2 | Page 1 of 1 |
| APPLICATION NO. | : 10/969102 | |
| DATED | : November 6, 2007 | |
| INVENTOR(S) | : Martin W. Beale et al. | |

It is certified that error appears in the above-identified patent and that said Letters Patent is hereby corrected as shown below:

Column 27, Claim 46, Line 65, delete "claimed in any previous".

Signed and Sealed this

Twenty-ninth Day of September, 2009

David J. Kappos
*Director of the United States Patent and Trademark Office*